(12) United States Patent
Utsuki et al.

(10) Patent No.: US 8,239,894 B2
(45) Date of Patent: Aug. 7, 2012

(54) ELECTRONIC APPARATUS, DISPLAY CONTROLLING METHOD FOR ELECTRONIC APPARATUS AND GRAPHICAL USER INTERFACE

(75) Inventors: Shingo Utsuki, Kanagawa (JP); Kazuto Nishizawa, Kanagawa (JP); Daisuke Inaishi, Tokyo (JP); Ko Kusanagi, Kanagawa (JP); Hiroshi Sato, Kanagawa (JP); Daisuke Sato, Kanagawa (JP); Kenichi Moriwaki, Tokyo (JP); Satoshi Kanda, Tokyo (JP); Yuji Ishimura, Tokyo (JP); Shimon Sakai, Tokyo (JP); Masahiro Urano, Kanagawa (JP)

(73) Assignee: Sony Corporation, Tokyo (JP)

( * ) Notice: Subject to any disclaimer, the term of this patent is extended or adjusted under 35 U.S.C. 154(b) by 1515 days.

(21) Appl. No.: 11/177,363

(22) Filed: Jul. 11, 2005

(65) Prior Publication Data

US 2006/0020970 A1 Jan. 26, 2006

(30) Foreign Application Priority Data

Jul. 12, 2004 (JP) ................ P2004-205127

(51) Int. Cl.
*G06F 3/00* (2006.01)
*G06F 13/00* (2006.01)
*G06F 3/048* (2006.01)
*H04N 5/445* (2011.01)

(52) U.S. Cl. ............... 725/52; 725/37; 725/40; 725/49; 715/700; 715/830

(58) Field of Classification Search ............. 725/38; 348/563
See application file for complete search history.

(56) References Cited

U.S. PATENT DOCUMENTS

| | | | |
|---|---|---|---|
| 5,990,884 A | 11/1999 | Douma et al. | |
| 6,175,362 B1 * | 1/2001 | Harms et al. | 715/721 |
| 6,266,098 B1 * | 7/2001 | Cove et al. | 348/563 |
| 6,370,550 B1 | 4/2002 | Douma et al. | |
| 6,425,129 B1 * | 7/2002 | Sciammarella et al. | 725/38 |
| 6,445,306 B1 * | 9/2002 | Trovato et al. | 340/12.25 |
| 6,690,391 B1 * | 2/2004 | Proehl et al. | 715/720 |
| 6,976,228 B2 * | 12/2005 | Bernhardson | 715/830 |
| 7,594,246 B1 * | 9/2009 | Billmaier et al. | 725/52 |
| 7,698,652 B2 * | 4/2010 | Sagar | 715/787 |

FOREIGN PATENT DOCUMENTS

| | | |
|---|---|---|
| EP | 0 875 837 A2 | 11/1988 |
| JP | 08-160853 | 6/1996 |
| JP | 11-073418 | 3/1999 |
| JP | 2000-249568 | 9/2000 |
| JP | 2001-265478 | 9/2001 |
| JP | 2003-066944 | 3/2003 |
| JP | 2003-134127 | 5/2003 |
| JP | 2003-256117 | 9/2003 |
| JP | 2003-288531 | 10/2003 |

* cited by examiner

*Primary Examiner* — Justin Shepard
(74) *Attorney, Agent, or Firm* — Finnegan, Henderson, Farabow, Garrett & Dunner, L.L.P.

(57) ABSTRACT

A graphical user interface is disclosed which achieves an easy search for a desired item upon scrolling. A plurality of representation images individually representing different selection object items are displayed in an array along one direction of a display screen. A noticed representation image selected from among the representation images is displayed emphatically at a fixed position on the display screen, and explanation information of the noticed representation image is displayed in the proximity of the noticed representation image. If a scrolling information for the array of representation images is issued, then scrolling is executed such that explanation information also of the representation images other than the noticed representation image is displayed. Further, a bar display including a mark representing the position and the group of the noticed representation image in the array of representation images is displayed together.

15 Claims, 20 Drawing Sheets

ELECTRONIC APPARATUS, DISPLAY CONTROLLING METHOD FOR ELECTRONIC APPARATUS AND GRAPHICAL USER INTERFACE

BACKGROUND OF THE INVENTION

This invention relates to an electronic apparatus such as a reception apparatus which can receive various types of broadcasts such as, for example, terrestrial analog broadcasts, terrestrial digital broadcasts, BS (Broadcasting Satellite) broadcasts and CS (Communication Satellite) broadcasts and a display controlling method for an electronic apparatus of the type mentioned.

Media used to provide image and music contents have been diversified, and also contents provided have been diversified and increased in quantity. For example, if only broadcasting media are taken, terrestrial analog broadcasting, terrestrial digital broadcasting, BS broadcasting, CS broadcasting media and so forth are available. Further, in the digital broadcasting media, the number of available program channels is as great as, for example, 150 channels. Furthermore, not only television programs but also radio programs and data broadcasting programs are provided by some channels.

Conventionally, also a multimedia reproduction apparatus which can reproduce contents of such various media as described above has been proposed and is disclosed, for example, in Japanese Patent Laid-Open No. Hei 11-73418 (hereinafter referred to as Patent document 1) (which corresponds to U.S. Pat. Nos. 5,990,884 and 6,370,550 and European Patent Application No. 875,837 A2).

Also a system has been proposed wherein a hard disk apparatus having a large storage capacity is used to record a large amount of broadcasting program contents.

SUMMARY OF THE INVENTION

In electronic apparatus such as recording and/or reproduction apparatus and reception apparatus of the types described above, a graphical user interface is demanded by which a user can rapidly search out a broadcasting program content of a broadcasting channel which the user wants to enjoy or a recorded content which the user wants to reproduce.

Particularly where the number of selection items is so great as in the case of, for example, broadcasting program contents for 150 channels, it is an ordinary method to perform scrolling to perform a rough search first and then perform selection of the items one by one. Thus, also a graphical user interface is demanded which makes it easy to search for a desired location upon such scrolling.

It is an object of the present invention to provide a graphical user interface which makes it possible to select an item readily upon scrolling on an electronic apparatus.

In order to attain the object described above, according to the present invention, there is provided an electronic apparatus, including a storage section for storing display data of a plurality of representation images individually representing a plurality of selection object items, an operation inputting section for accepting an operation input of a user for images displayed on a display screen and including the representation images, and a display control section for displaying the plural representation images using the display data stored in the storage section such that the plural representation images are arrayed along one direction of the display screen and one of the representation images can be selected in response to an operation input through the operation inputting section, the display control section emphatically displaying a noticed representation image selected from among the plural representation images with the display position of the selected noticed representation image fixed on the display screen, the display control section changing the noticed representation image in response to the operation output signal based on a selection operation of one of the representation images through the operation inputting section, the display control section displaying explanation information of the noticed representation image in the proximity of the display position of the noticed representation image, the operation inputting section being operable to accept an operation input of the user for scrolling the plural representation images in the one direction and output a scrolling operation output signal, the display control section executing the scrolling in response to the scrolling operation output signal such that explanation information of all of the representation images arrayed along the one direction on the display screen including the noticed representation image is displayed additionally and the noticed representation image is successively changed during the scrolling.

In the electronic apparatus, a plurality of representation images are displayed arrayed along one direction, and that one of the plural representation images which is displayed at a fixed position determined in advance is determined as a selected noticed representation image and is displayed emphatically. Further, explanation information of the noticed representation image is displayed in the proximity of the noticed representation image.

Then, if a user uses the operation inputting section to perform a selection operation of the representation images, then the noticed representation image at the fixed position is changed so that it is replaced by the selected representation image. Upon such selection, explanation information of the representation images is displayed only with regard to the noticed representation image.

If, in this state, the user performs an inputting operation for scrolling the representation images through the operation inputting section, then explanation information not only of the noticed representation image but also of all of the plural representation images displayed on the display screen is displayed, and scrolling of the representation images is executed together with the explanation information. At this time, the noticed representation image displayed a at the fixed position is changed in response to the scrolling.

Accordingly, with the electronic apparatus, when the representation images are scrolled, the noticed representation image successively changes in response to the scrolling. Further, not only explanation information of the noticed representation image changes in response to the scrolling similarly, but also image information displayed with regard to the plural representation images including the noticed representation image changes in response to the scrolling. Consequently, the scrolling state is displayed in manner in which the user can recognize it very readily. Further, the user can easily grasp those of the representation images which precede to and follow the noticed representation image being scrolled from the explanation information of them. Consequently, the user can perform a search of a desired representation image readily.

Preferably, the display control section additionally displays, on the display screen, a bar display including a mark representing the position of the noticed representation image in the array of the plural representation images including the noticed representation image in response to the scrolling operation output signal.

In the electronic apparatus, during scrolling, a bar display including a mark representing the position of the noticed representation image in the array of the plural representation images is displayed on the display screen. Consequently, the user can utilize the bar display when it searches for the position of a desired representation image. Therefore, the search can be performed readily.

Further preferably, the plural representation images are divided into a plurality of groups based on attributes relating to the selection object items and the displaying order of the plural representation images on the display screen is set collectively for each of the groups while the bar display is divided into a plurality of divisional portions in response to the plural groups and each of the divisional portions of the bar display is provided with a group display representing to which one of the groups the divisional portion belongs.

In the electronic apparatus, the representation images are divided into a plurality of groups based on attributes relating to the selection object items such as the substances of the processing function items or the substances of processing object contents, and the displaying order of the plural representation images on the display screen is set collectively for each of the groups. Further, the bar display displayed during the scrolling is divided into a plurality of divisional portions in response to the groups, and each of the divisional portions of the bar display is provided with a group display representing to which one of the groups the divisional portion belongs.

Accordingly, depending upon at which group position in the bar display the mark corresponding to the noticed representation image is positioned, it can be recognized readily to which group the noticed representation image belongs.

In summary, with the electronic apparatus, when a desired item is searched for through scrolling, not only explanation information of the noticed representation information is displayed, but also explanation information regarding other plural representation images being scrolled is displayed. Consequently, a search through scrolling is facilitated.

Further, when the representation images are scrolled, the bar display including the mark representing the position of the noticed representation image in the plural representation images is displayed on the display screen. A search through scrolling is facilitated. The scrolling search is further facilitated where the bar display includes a display of groups based on the selection object items represented by the representation images.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

In the following, broadcast reception apparatus each as an electronic apparatus to which the present invention is applied are described. The broadcast reception apparatus are configured so as to receive broadcasting signals from a plurality of different types of broadcasting media. Further, the broadcast reception apparatus of the embodiments of the present invention use an icon as a representation image.

[First Embodiment]

Figure 1:
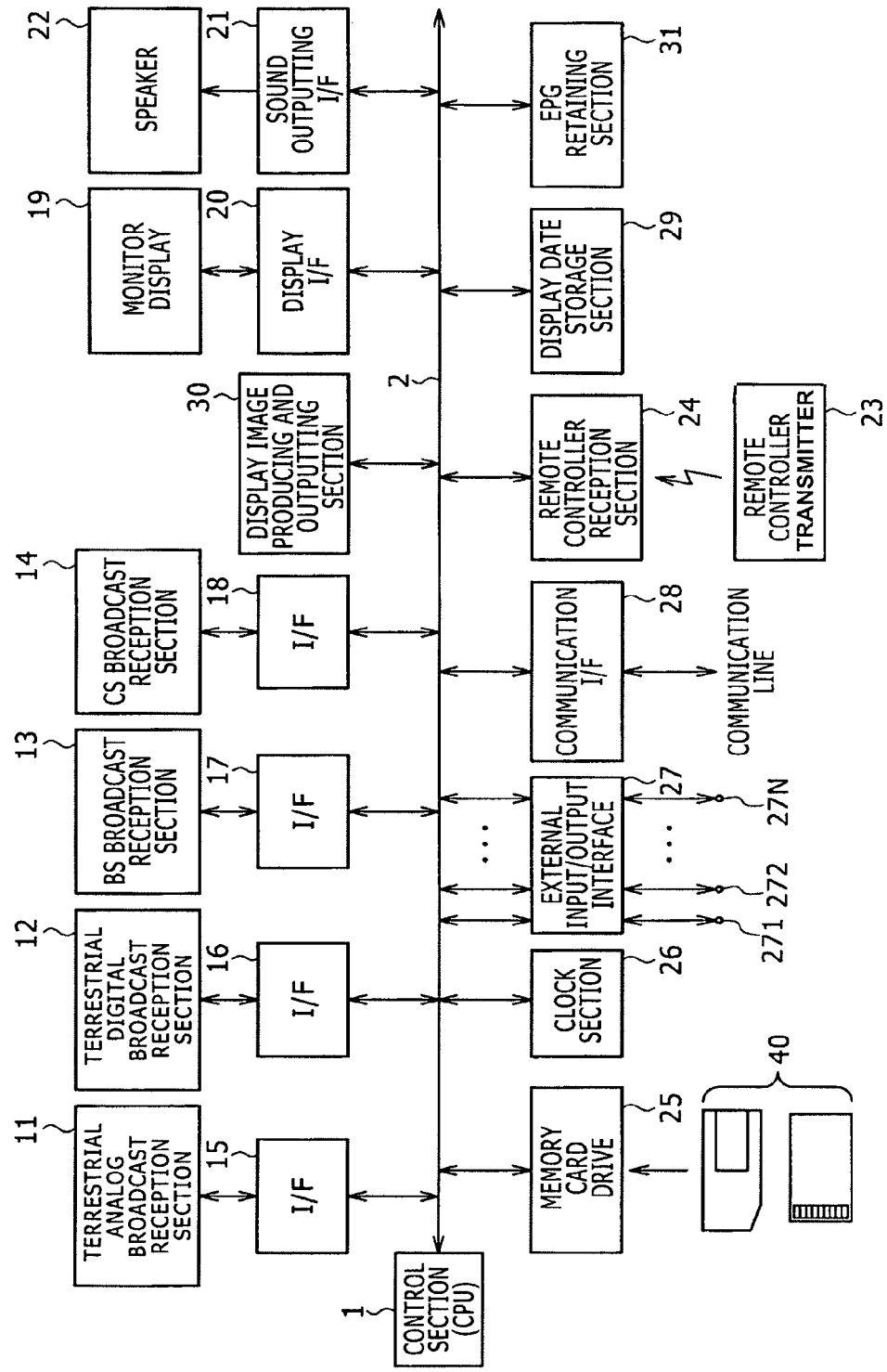
FIG. 1 is a block diagram showing an example of a hardware configuration of a broadcast reception apparatus as an electronic apparatus to which the present invention is applied.

FIG. 1 shows an example of a hardware configuration of a broadcast reception apparatus as an electronic apparatus according to a first embodiment of the present invention.

Referring to FIG. 1, the broadcasting reception apparatus is configured such that various broadcast reception sections and various processing sections such as an image output display section, a sound outputting section and an operation inputting section are connected to a system bus 2 which is in turn connected to a control section 1 formed from a microcomputer.

In particular, the broadcasting reception apparatus includes a terrestrial analog broadcast reception section 11, a terrestrial digital broadcast reception section 12, a BS broadcast reception section 13 and a CS broadcast reception section 14 as the broadcast reception sections. The terrestrial analog broadcast reception section 11, terrestrial digital broadcast reception section 12, BS broadcast reception section 13 and CS broadcast reception section 14 are connected to the system bus 2 through interfaces 15, 16, 17 and 18 provided respectively.

The terrestrial analog broadcast reception section 11 selectively receives existing terrestrial analog television broadcasting signals and outputs an image signal (video signal) and a sound signal (audio signal) to the system bus 2 through the interface 15.

The terrestrial digital broadcast reception section 12 is ready for digital television broadcasting, digital audio broadcasting and data broadcasting and selectively receives and decodes a broadcasting program in response to a selection operation of a user. Then, the terrestrial digital broadcast reception section 12 outputs an image signal (video signal), a sound signal (audio signal) and data such as EPG (Electronic Programming Guide) data to the system bus 2 through the interface 16.

The BS broadcast reception section 13 is ready for BS television broadcasting, BS audio broadcasting and data broadcasting and selectively receives and decodes a broadcasting program in response to a selection operation of a user. Then, the BS broadcast reception section 13 outputs an image signal (video signal), a sound signal (audio signal) and data such as EPG data to the system bus 2 through the interface 17.

The CS broadcast reception section 14 is ready for CS television broadcasting, CS audio broadcasting and data broadcasting and selectively receives and decodes a broadcasting program in response to a selection operation of a user. Then, the CS broadcast reception section 14 outputs an image signal (video signal), a sound signal (audio signal) and data such as EPG data to the system bus 2 through the interface 18.

Further, in the broadcasting reception apparatus shown in FIG. 1, a monitor display unit 19 formed from a CRT (Cathode Ray Tube), an LCD (Liquid Crystal Display) panel or the like is connected as an image outputting display section to the system bus 2 through a display interface 20. Further, in the broadcasting reception apparatus, a speaker 22 is connected as a sound outputting section to the system bus 2 through a sound outputting interface 21.

Further, in the broadcasting reception apparatus, a remote controller transmitter 23 is provided as an operation inputting section, and a remote controller reception section 24 for receiving a remote control signal from the remote controller transmitter 23 is connected to the system bus 2. The remote controller transmitter 23 in the broadcasting reception apparatus includes at least leftward and rightward direction indicating operation buttons and upward and downward direction indicating operation buttons, a "home" button and a "determination" button. In response to an operation of any of such buttons by the user through the remote controller transmitter 23, a selection instruction or the like is performed on a graphical user interface screen.

It is to be noted that the leftward and rightward direction indicating operation buttons and upward and downward direction indicating operation buttons can be formed from, for example, a cross-shaped upward, downward, leftward and rightward indicating button, a joystick or some other element.

Further, a memory card drive 25, a clock section 26, an external input/output interface 27, a communication interface 28 and a display image producing and outputting section 30, a display data storage section 29 and an EPG retaining section 31 are connected to the system bus 2.

The control section 1 includes a CPU (Central Processing Unit), a program ROM (Read Only Memory), a working area RAM (Random Access Memory) and so forth and executes various processes using the working area RAM in accordance with a program written in the program ROM.

Each of the broadcast reception sections 11 to 14 selects, from among object broadcasting signals received by an antenna not shown, a broadcasting program in response to a selection operation of a user inputted through the remote controller transmitter 23 and signals image data and sound data of the selected broadcasting program or data received from a data broadcast to the system bus 2.

While the broadcasting reception apparatus of the present embodiment provides a broadcasting program to the user from one of the broadcast reception sections 11 to 14, which one of the broadcast reception sections 11 to 14 is to be selected depends upon a selective operation input from the remote controller transmitter 23 through a graphical user interface hereinafter described.

The memory card drive 25 is provided to read data from a memory card 40 inserted therein or write data into the memory card 40. The apparatus shown in FIG. 1 can read out and write data from and into various types of memory cards.

The clock section 26 provides information of the time at present and calendar information. The clock section 26 is used also for reservation setting of a broadcasting program and measurement of times of various timers corresponding to such reservation setting.

The external input/output interface 27 includes various external input/output terminals such as video input/output terminals, audio input/output terminals and USB (Universal Serial Bus) terminals and transfers signals between the input/output terminals and the system bus 2.

The communication interface 28 is connected to a communication line and is used to transmit, where a data broadcast program is a bidirectional broadcast, a response signal to a predetermined destination or acquire data broadcast contents from a server apparatus through a network. It is to be noted that the communication interface 28 may be used additionally to fetch data such as data of a web content through the Internet or signal predetermined information through the Internet.

The display data storage section 29 stores data of icons which form the graphical user interface hereinafter described, channel display data, and other display data such as character data.

The display image producing and outputting section 30 produces an image to be displayed on the monitor display unit 19 under the control of the control section 1 and forms a display control section together with the control section 1.

The display image producing and outputting section 30 stores image data and music data from the broadcast reception sections 11 to 14 into an output buffer built therein. Further, the display image producing and outputting section 30 acquires data for displaying characters and symbols for the graphic user interface from the display data storage section 29 and stores the data as on-screen display data into an on-screen buffer built therein. The on-screen display data are used to be displayed in an overlapping relationship with a reproduced image displayed on the screen of the monitor display unit 19. At this time, the data and the display image are displayed such that the display image can be observed from below, for example, through the overlapping image such as the graphical user interface image.

The display image producing and outputting section 30 supplies composite data of data stored in the output buffer and on-screen display data stored in the on-screen buffer to the monitor display unit 19 through the display interface 20.

The EPG retaining section 31 retains data of an electronic program guide (EPG data) in a memory built therein. The EPG data used here are obtained, with regard to a terrestrial analog broadcast, from a television broadcast signal wherein the EPG data are superposed within a vertical blanking period, and, with regard to a digital broadcast, from a data broadcast sent in the digital broadcast. The EPG data include data of the name of a broadcasting station, the name of a broadcasting program, the starting time of the program, the ending time of the program, performers, the genre of the program and so forth of each of broadcasting programs.

The EPG retaining section 31 retains EPG data received from the broadcast reception sections 11 to 14 into a memory thereof. The EPG data retained in the EPG retaining section 31 are updated so as to be the latest data.

It is to be noted that the EPG data to be used may not be acquired from a broadcasting signal on which the EPG data are superposed but may otherwise be acquired, for example, from an EPG data providing server connected to the Internet by accessing the EPG data providing server using the communication interface 28.

[Graphical User Interface]

In the broadcasting reception apparatus of the present embodiment, selection of a broadcasting medium, selection of a broadcasting program and selection of any other function can be performed simply and readily by a user using a graphical user interface.

The graphical user interface of the broadcasting reception apparatus of the present embodiment includes a plurality of icons which can be selectively designated by a user through an operation of a predetermined button key of the remote controller transmitter 23 and explanation information of the icons.

The icons to be displayed on the screen of the monitor display unit 19 include category icons representing broadcasting media, setting functions, categories of processing functions of an external output and so forth and processing objects, and item icons representing processing function items belonging to the categories (which therefore form a lower hierarchy) and items of processing object contents.

In the present embodiment, seven categories of "setting," "photo," "video," "terrestrial broadcast," "BS broadcast," "CS broadcast" and "external input" are set in advance as the categories to be represented by the category icons. Data of the seven category icons are stored in the display data storage section 29.

The number of item icons representing processing function items and items of processing object contents in a lower hierarchy of each category differs among different categories.

Figure 2:
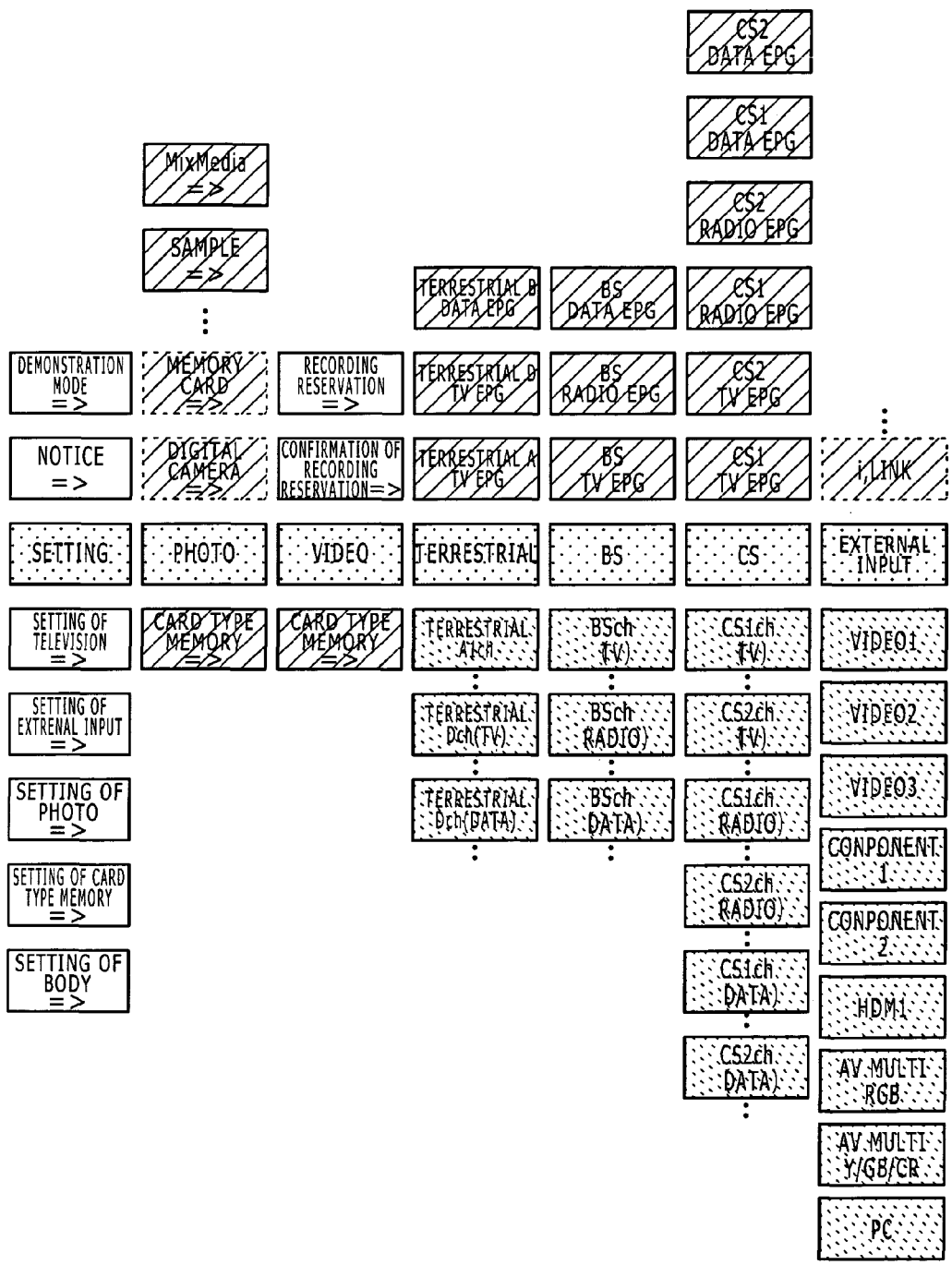
FIG. 2 is a diagrammatic view illustrating a relationship between categories as a first item and a second item of a lower hierarchy in the broadcast reception apparatus of FIG. 1.

FIG. 2 shows an example of items individually belonging to the categories in the broadcasting reception apparatus of the present embodiment. In particular, in FIG. 2, the categories indicated by halftone dots are shown arranged in a horizontally row, and a plurality of items belonging to each category are shown arranged in an upward and downward column from the category. In FIG. 2, each item belonging to a category indicates that, where "=>" is described in the description of the explanation of the item, it has items of a lower hierarchy.

Meanwhile, each item indicated by rightwardly upwardly inclined slanting lines is an item of utility (called utility item). On the other hand, each item indicated by rightwardly downwardly inclined slanting lines is an item whose function completes (called function completion item) and may be a content selection item of a broadcasting channel or the like or an input changeover item. Further, each item to which none of halftone dots or slanting lines are applied signifies a logic folder.

As seen in FIG. 2, for example, the category of "setting" includes only items of logic folders and particularly includes a plurality of items such as "setting of television," "setting of external input" and "setting of photo".

Further, the category of "photo" includes, as utility items, items of "card type memory," "sample," and "mix media". It is to be noted that any utility item surrounded by a dotted line is an item whose item icon is displayed only when a corresponding medium is available.

Further, the category of "video" includes items, as items of logic folders, of recording reservation, recording reservation confirmation and so forth and further includes, as a utility item, an item of "card type memory".

Further, each of the categories of broadcasting media includes utility items indicated above the category title and broadcasting channel items as function completion items indicated below the category title.

The items of broadcasting channels which are function completion items belonging to the categories of broadcasting media are grouped for each broadcasting object such as a television, a radio and data. In particular, selection object items belonging to the category of each broadcasting medium are grouped based on the broadcasting object as an attribute relating to the selection object item.

In particular, in the example of FIG. 2, the selection object items of the category of the terrestrial broadcasting media are divided into a group of terrestrial analog broadcasting channels ("terrestrial A1 ch" is one of the channels), another group of television channels of terrestrial digital broadcasts ("terrestrial D ch (TV)" is one of the channels), and a further group of data broadcasts of the terrestrial digital broadcasts ("terrestrial D ch (data)" is one of the channels).

The selection object items of the category of the BS broadcasting media are divided into a group of television channels of the BS broadcasts ("BS ch (TV)" is one of the channels), another group of radio channels of the BS broadcasts ("BS ch (radio)" is one of the channels), and a further group of data broadcasts of the BS broadcasts ("BS ch (data) is one of the channels).

Further, the category of the CS broadcasting media includes two broadcasting media of CS1 and CS2, and the selection object items thereof are divided into a group of television channels of the CS1 broadcast ("CS1 ch (TV)" is one of the channels), another group of television channels of the CS2 broadcasts ("CS2 ch (TV)" is one of the channels), a further group of radio channels of the CS1 broadcast ("CS1 ch (radio)" is one of the channels), a still further group of radio channels of the CS2 broadcasts ("CS2 ch (radio)" is one of the channels), a yet further group of data broadcasts of the CS1 broadcast ("CS1 ch (data)" is one of the channels), and a yet further group of data broadcasts of the CS2 broadcast ("CS2 ch (data)" is one of the channels.

Further, as regards an EPG as a utility item in the category of each of the broadcasting media, an EPG corresponding to each group is prepared. For example, "terrestrial A TV EPG" is an EPG for a terrestrial analog television broadcast; "terrestrial D TV EPG" is an EPG for a terrestrial digital television broadcast; and "terrestrial D data EPG" is an EPG for a data broadcast of a terrestrial digital broadcast.

The "external input" category includes, as function completion items, such input changeover items as "video 1," "video 2" and "component 1".

In the present embodiment, a graphical user interface is provided wherein a structure which includes a plurality of processing function items and such items as a processing object contents substance item immediately below each of the plural categories shown in FIG. 2 is reflected on the display of the screen of the monitor display unit 19.

In particular, each of the categories of FIG. 2 is displayed, on the screen of the monitor display unit 19, in the form of a corresponding icon (hereinafter referred to as category icon), and each of the items shown in FIG. 2 is displayed, on the screen of the monitor display unit 19, in the form of a corresponding icon (hereinafter referred to as item icon). Thus, in a conception, FIG. 2 illustrates a relationship between the category icons and the item icons immediately below the category icons.

Figure 3:
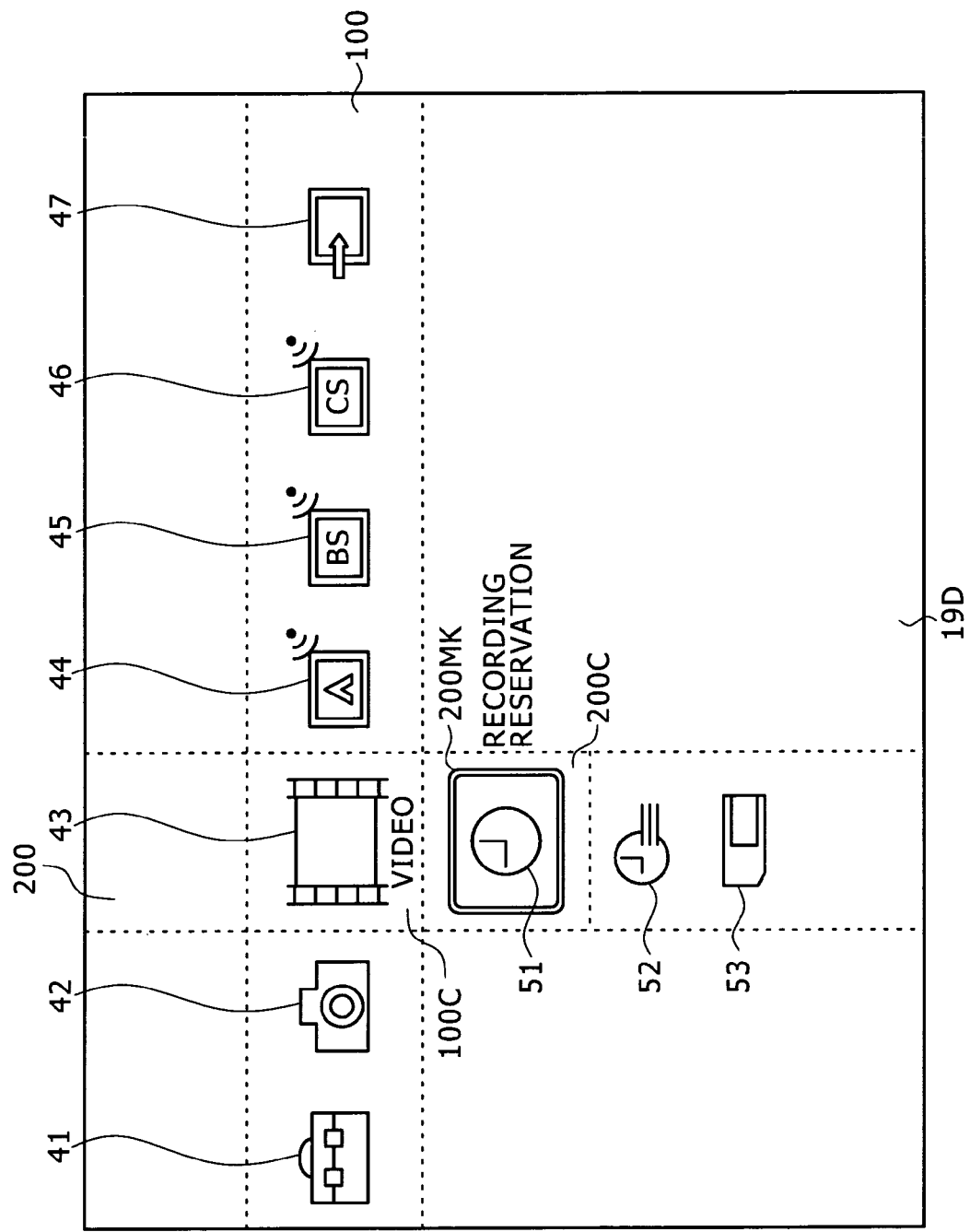
FIG. 3 is a diagrammatic view showing an example of a graphical user interface screen of the broadcast reception apparatus of FIG. 1.

FIG. 3 shows an example of an initial menu screen of a graphical user interface screen displayed on the screen 19D of the monitor display unit 19 in the present embodiment. In the present embodiment, the graphical user interface screen is displayed on or erased from the screen 19D every time the "home" button provided on the remote controller transmitter 23 which forms the operation inputting section is operated.

On the initial menu screen of the present example, a two-dimensional array is displayed wherein a category icon array 100 in which a plurality of category icons are arranged in a horizontal row and an item icon array 200 in which a plurality of item icons are arrayed in a vertical column intersect with each other at a substantially central portion of the screen.

The seven different category icons described hereinabove are arrayed in the category icon array 100. In particular, referring to FIG. 3, an icon 41 formed from a pattern of a tool box is the category icon of "setting"; an icon 42 formed from a pattern of a camera is the category icon of "photo"; an icon 43 formed from a pattern of a film is the category icon of "video"; an icon 44 including a pattern of a steel tower is the category icon of "terrestrial digital broadcasting"; an icon 45 including the characters of "BS" is the category icon of "BS digital broadcasting"; an icon 46 including the characters of "CS" is the category icon of "CS digital broadcasting"; and an icon 47 including a horizontally directed arrow mark is the category ion of "external input".

As seen from FIG. 3, in the present embodiment, the category icon array 100 is displayed horizontally a little on the higher side than the center in the vertical direction of the screen 19D of the monitor display unit 19. Further, one of the seven category icons 41 to 47 is normally selected, and the selected category icon is emphasized by displaying the same a little greater than the other category icons so as to inform the user of which one of the category icons is currently selected. In the example of FIG. 3, the category icon 43 of "video" is the selected category icon. Below the selected category icon, the title name of the category represented by the category icon is displayed as seen in FIG. 3.

In this instance, in the present embodiment, the graphical user interface display screen displays such that, as seen in FIG. 3, the seven different category icons are normally displayed on the screen while the item icon array 200 is displayed with regard only to the category icon being selected from among the seven category icons.

Accordingly, the initial menu of the graphical user interface in the present embodiment is formed from an icon array wherein the category icon array 100 and the item icon array 200 intersect in a cross shape with each other.

The item icon array 200 includes a plurality of item icons representing a plurality of items belonging to the category corresponding to the selected category icon. In the example of FIG. 3, since the "video" category icon 43 is selected, item icons 51, 52 and 53 belonging to the "video" category icon 43 are displayed in a vertical column as the item icon array 200.

It is to be noted that, while, in FIG. 3, no item icon is shown above the item icon array 200, this is because the number of items which belong to the category of "video" is small, but where the number of items is great, item icons are arrayed also above the category icon array 100 in the vertical direction. Further, as hereinafter described, also when the item icon to be selected changes, item icons appear also above the category icon array 100.

Further, where the number of items in a lower hierarchy of a category icon is great like the category icons 44 to 46 of the broadcasting media hereinafter described and the category icon of the external input, it is difficult, from the size of the display screen of the monitor display unit 19, to display all of items of the lower hierarchy of a selected category at a time on the screen 19D. Therefore, those item icons which are displayed as the item icon array 200 on the screen 19D are only part of the items of the selected category.

Figure 4:
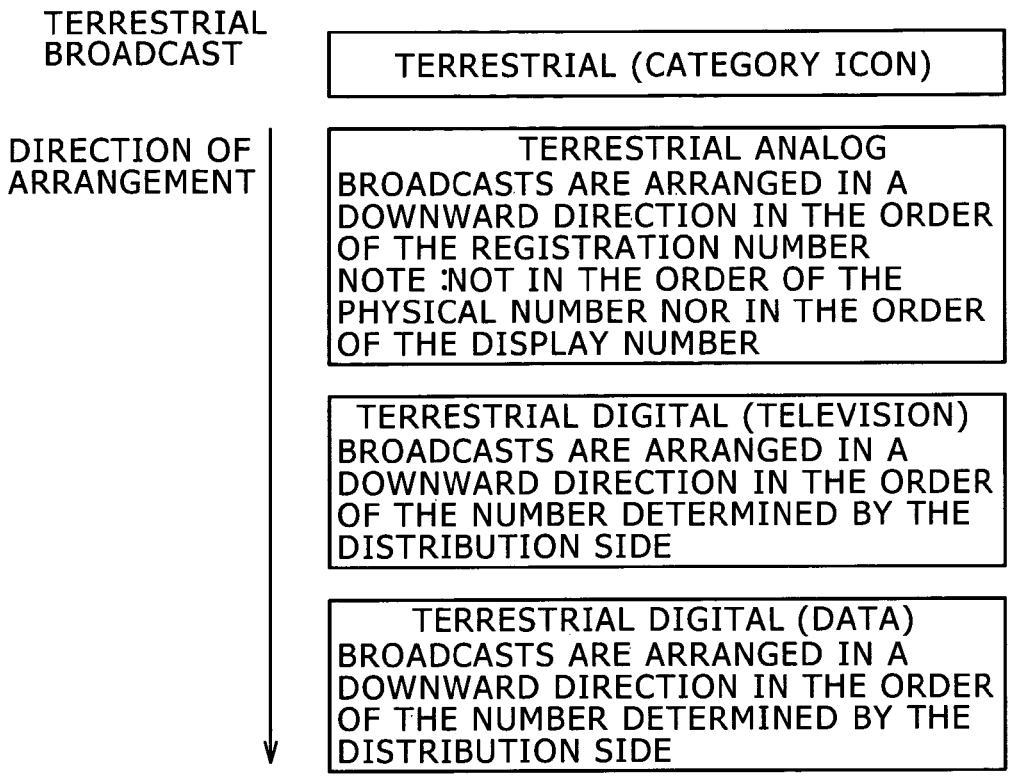
FIGS. 4 to 6 are diagrammatic views illustrating arrangements of the second items in the broadcast reception apparatus of FIG. 1.
Figure 5:
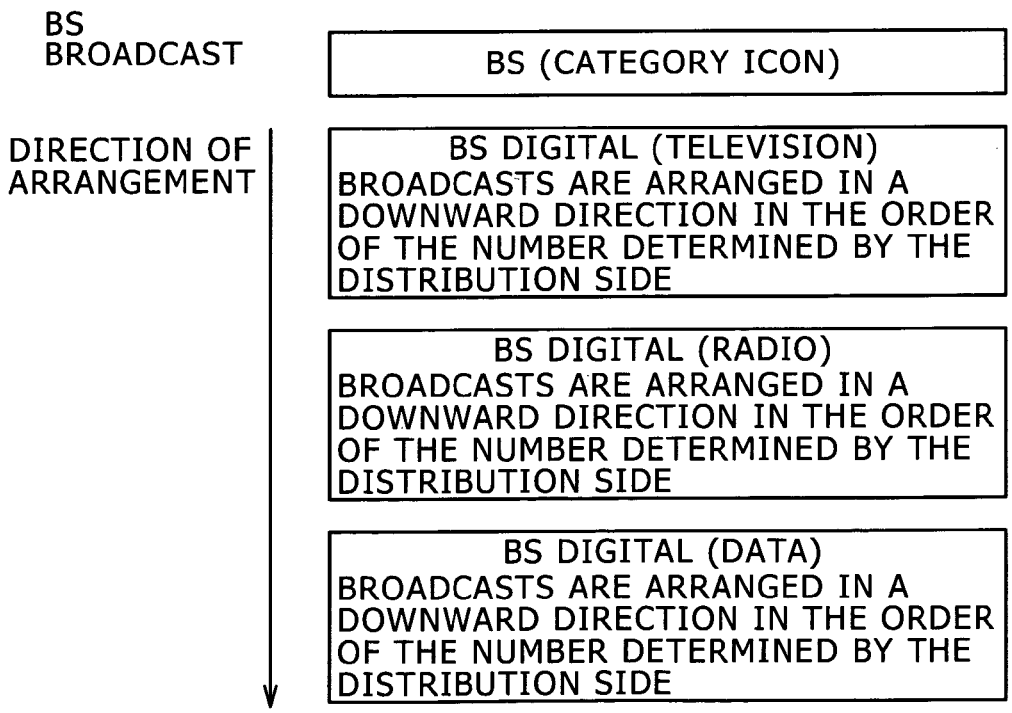
Figure 6:
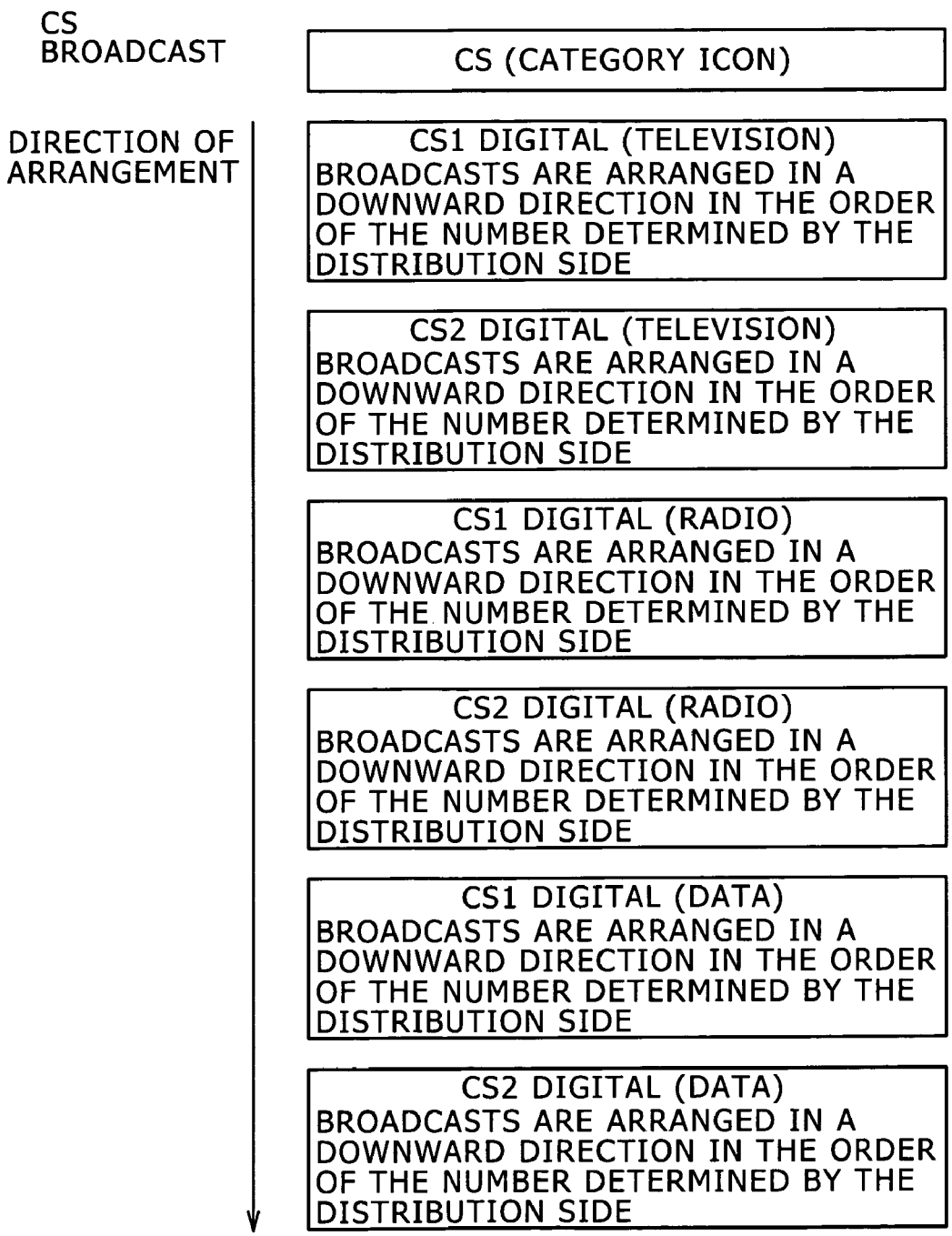

It is to be noted that the arrays of the item icons of the channel items immediately below the category icons 44 to 46 are such as shown in FIGS. 4 to 6, respectively. In particular, while the channels of the broadcasting media are grouped for each broadcasting object as described hereinabove, the array order of the group units and the array order of the channels in the groups in the present embodiment are determined in the following manner.

FIG. 4 illustrates the array order with regard to the terrestrial broadcasting category. Referring to FIG. 4, where the downward direction from a location immediately below the terrestrial broadcasting category icon 44 is determined as an array direction, the groups are arrayed in the order of the terrestrial analog broadcasting, terrestrial digital (television) and terrestrial digital (data).

Then, in the group of the terrestrial analog broadcasting, the belonging channels are arrayed in the order of registered channel numbers in the array direction. The array order is the registered number order but not the physical number order nor the displayed number order.

Meanwhile, in the group of the terrestrial digital broadcasting (television), the belonging channels are arrayed in the order of the numbers determined in the distribution order in the array direction. Also in the terrestrial digital broadcasting (data) group, the channels are arrayed in the order of the numbers determined in the distribution order in the array direction.

FIG. 5 illustrates the array order with regard to the BS broadcasting category. Referring to FIG. 5, where the downward direction from a location immediately below the terrestrial broadcasting category icon 44 is determined as an array direction, the groups are arrayed in the order of the BS digital (television), BS digital (radio) and BS digital (data).

Then, in each of the groups of the BS digital (television), BS digital (radio) and BS digital (data), the belonging channels are arrayed in the order of the numbers determined in the distribution order in the array direction.

FIG. 6 illustrates the array order with regard to the CS broadcasting category. Referring to FIG. 6, where the downward direction from a location immediately below the terrestrial broadcasting category icon 44 is determined as an array direction, the groups are arrayed in the order of the CS1 digital (television), CS2 digital (television), CS1 digital (radio), CS2 digital (radio), CS1 digital (data) and CS2 digital (data).

Then, in each of the groups of the CS1 digital (television), CS2 digital (television), CS1 digital (radio), CS2 digital (radio), CS1 digital (data) and CS2 digital (data), the belonging channels are arrayed in the order of the numbers determined in the distribution order in the array direction.

It is to be noted that broadcasting programs of the channels arrayed in any of the array orders illustrated in FIGS. 4 to 6 are formed from those searched out from within EPG data of the individual broadcasting media at a point of time when the graphical user interface screen is displayed.

The graphical user interface screen in the present embodiment is an on-screen display screen and is displayed in an overlapping and translucent relationship on the front face of an image of an image content displayed on the screen 19D. In particular, the graphical user interface screen is displayed in such a display manner that, when a broadcasting program is being viewed on the broadcasting reception apparatus or when an image picked up by a camera is being reproduced, the image can be observed translucently through the graphical user interface screen.

It is to be noted that an entire region of the category icon array 100 and the item icon array 200 surrounded by dotted lines in FIG. 3 may be colored so as to facilitate distinction in appearance from the background region of the screen 19D or the brightness of the content image may be adjusted so as to make it easy to watch the graphical user interface. Naturally, only the category icons or item icons may be displayed without taking such measures as coloring or adjustment of the brightness.

Further, in the present example, the category icon array 100 in the initial menu screen of the graphical user interface screen does not move in the vertical direction of the screen 19D but is displayed fixedly at a position, for example, a little higher than from the center of the screen 19D in the vertical direction as shown in FIG. 3. Further, in the present embodiment, the region in which a selected category icon is displayed is an intersecting region 100C at which the category icon array 100 and the item icon array 200 intersect with each other, and also the intersecting region 100C is fixed on the screen 19D. As described hereinabove, below the category icon positioned in the intersecting region 100C, the category title name of the category icon is displayed.

If the user operates the leftward or rightward direction indicating operation button of the remote controller transmitter 23 to change the selected category icon to another category icon, then the plural category icons in the category icon array 100 move in the entire array thereof in the leftward or rightward direction in response to the leftward or rightward instruction of the user to change the selected category icon displayed in the intersecting region 100C.

The control section 1 recognizes the category icon displayed in the intersecting region 100C thereby to recognize the category selected by the user.

Also the item icon array 200 does not move in the horizontal direction similarly, but is displayed fixedly at a position, for example, a little leftwardly of the center in the horizontal direction as seen in FIG. 3. However, the plural item icons in the item icon array 200 can be moved in the upward or downward direction in response to an instruction of the upward or downward direction of the user issued through the upward or downward direction indicating operation button of the remote controller transmitter 23 serving as the operation inputting section.

As described above, since the display position in the vertical direction of the category icon array 100 in which the plural category icons 41 to 47 are arrayed in a row in the horizontal direction is fixed and the display position in the horizontal direction of the item icon array 200 in which a plurality of item icons are arrayed in a column in the vertical direction is fixed, the intersecting region 100C between the category icon array 100 and the item icon array 200 is fixed at a position obliquely leftwardly upwards with respect to the center of the display screen 19D.

Further, in the present embodiment, the region 200C immediately below the intersecting region 100C is determined as a region of an item icon selected by the user from among a plurality of item icons in the item icon array 200. In other words, in the present embodiment, the control section 1 recognizes the item icon displayed in the region 200C (the region 200C is hereinafter referred to as noticed region) immediately below the intersecting region 100C as a selected item icon (the selected item icon is hereinafter referred to as noticed item icon) thereby to recognize the selected item.

It is to be noted that, since the items are laid out and arrayed in such a manner as described above on the graphical user interface, in the present embodiment, the noticed region 200C is positioned substantially at the center of the screen 19D. In order to make it possible to distinguish the noticed item ion displayed in the noticed region 200C from the other item icons, the noticed item icon in the present embodiment is surrounded by a quadrangular framework 200MK colored in a conspicuous color such as, for example, yellow so that it is displayed emphatically.

It is to be noted that the method of emphatic display is not limited to the method wherein the noticed item icon is surrounded by the quadrangular framework 200MK but a different method may be used. For example, similarly as in the case of the category icons, the noticed item icon may be displayed in a color different from the other item icons or displayed in a greater size than that of the other item icons or else may be displayed flickering.

As described above, in the present embodiment, the category icon displayed in the intersecting region 100C at a fixed position is determined as a selected category icon, and the item icon displayed in the noticed region 200C immediately below the intersecting region 100C is determined as a noticed item icon.

Therefore, in the present embodiment, a category selection operation by a user is an operation of moving the category icon array 100 in a horizontal direction so that a category icon corresponding to a desired category is displayed in the intersecting region 100C, and an operation of a determination button for category selection or the like is not required. This is because, when the selected category is positioned in the intersecting region 100C, the item icon array 200 representing a plurality of items belonging to the selected category appears automatically.

Accordingly, the user can select a category only by issuing an instruction of the leftward or rightward direction, and such an instruction operation as is performed on a personal computer such as a clicking operation of an icon displayed fixedly on a screen by means of a mouse is unnecessary. Therefore, even if the user is unfamiliar to a personal computer, the user can perform a selection operation readily.

It is to be noted that, while the category icons are moved leftwardly or rightwardly, they may all be displayed in the same color and with the same size, and when the leftward or rightward movement is stopped to position one of the category icons at the intersecting region 100C finally, the color or the size of the category icon may be changed so as to display the category icon emphatically.

It is to be noted that, as the change of the color, such a factor as the luminosity, saturation or hue of the category icon may be changed or the color may be changed by flickering display. Since the category icon positioned in the intersecting region 100C is displayed in a different displaying manner from that of the other category icons, the user can select a category readily.

It is to be noted that it is possible to hold, when the category icons are moving in the leftward or rightward direction and none of the category icons is positioned in the intersecting region 100C, the item icon array 200 from being displayed and display, when one of the category icons is positioned finally in the intersecting region 100C, the item icon array 200 such that it extends in a projecting manner in the upward and downward direction from the intersecting region 100C.

The user can recognize those items which belong to the category displayed in the intersecting region 100C only by operating the category icons to scroll leftwardly or rightwardly. Further, the user can recognize the category from a plurality of items displayed in a projecting extending fashion.

It is to be noted that it is possible to display, if an instruction of the leftward or rightward direction is issued through the remote controller transmitter 23 while the item icon array 200 is displayed, the extended item icon array 200 in a contracting fashion toward the intersecting region 100C.

On the other hand, the selection operation of an item in a lower hierarchy of the selected category is an operation of moving the item icon array 200 in the vertical direction until an item icon corresponding to a desired item is displayed in the noticed region 200C.

In particular, the item icons in the item icon array 200 are moved in the vertical direction of the screen 19D in response to an instruction of the upward or downward direction of the user issued through the upward or downward direction instruction operation button of the remote controller transmitter 23, whereupon the item icon positioned in the noticed region 200C immediately below the intersecting region 100C changes. Then, if the user operates the "determination" button of the remote controller transmitter 23 while the item icon of a desired item is positioned in the noticed region 200C, then the control section 1 of the broadcasting reception apparatus erases the graphical user interface and establishes a state wherein processing of the item is to be executed.

However, when items of a lower hierarchy with respect to the item icon positioned in the noticed region 200C are defined, the items of the lower hierarchy are displayed on the screen 19D in response to an operation of the "determination button".

Figure 7:
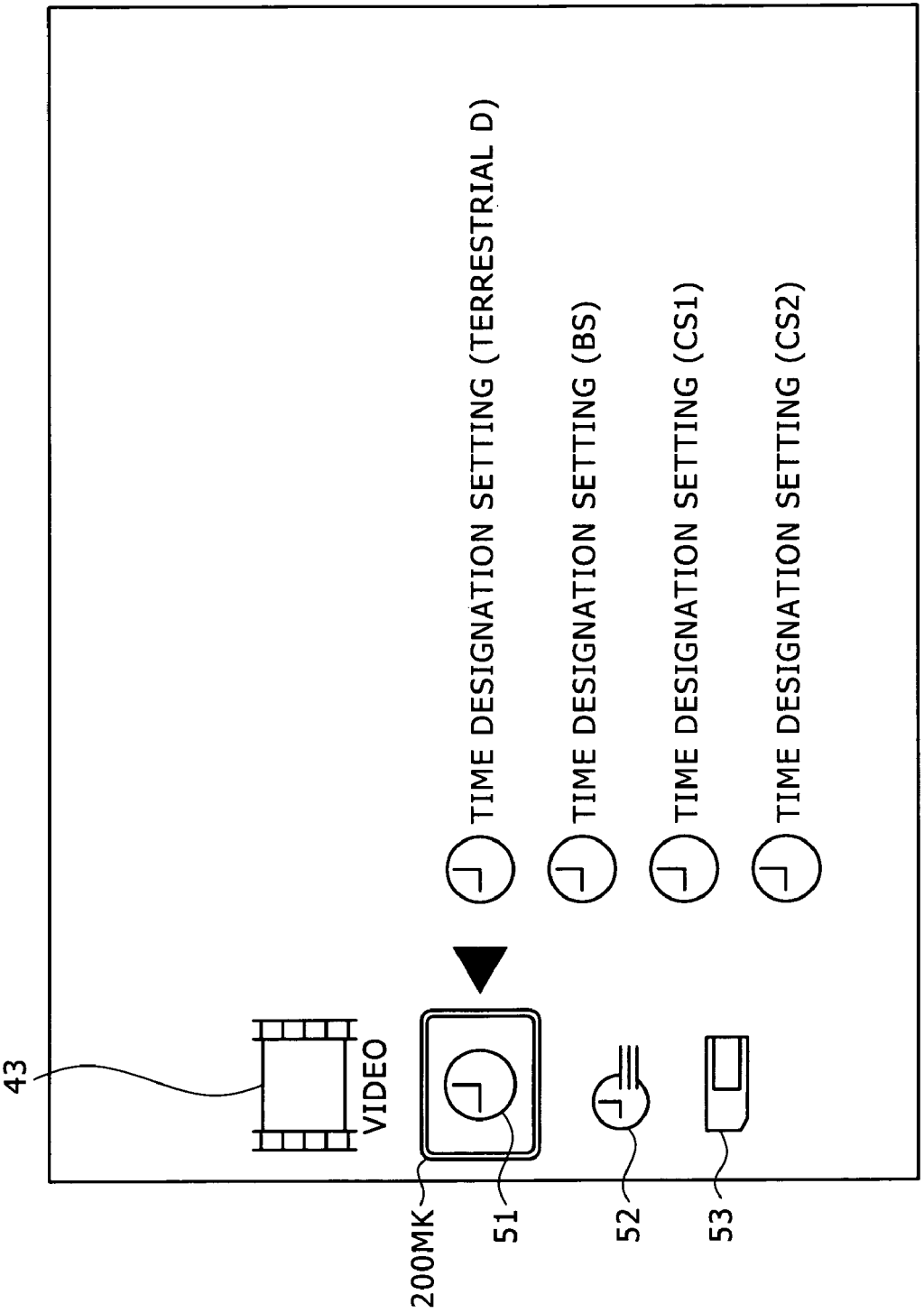
FIGS. 7 to 11 are schematic views showing different examples of a graphical user interface screen in the broadcast reception apparatus of FIG. 1.

Since, with respect to the item "recording reservation" in the example of FIG. 3, items of a lower hierarchy are defined, if the "determination" button of the remote controller transmitter 23 is operated on the screen of FIG. 3, then the graphical user interface screen changes to such a screen as shown in FIG. 7.

Referring to FIG. 7, in the example shown, the category icon array disappears from the screen 19D only leaving the category icon being selected, and the display position of the item icon array moves to the left end of the screen 19D to leave out the space on the right side with respect to the item icon array. Then, in the left out space, a plurality of item icons in the lower hierarchy are displayed in an upward and downward array and explanation information regarding the substance of the items corresponding to the item icons is displayed. At this time, explanation information regarding all of the item icons of the lower hierarchy is displayed as seen in FIG. 7.

Then, the quadrangular framework 200MK which emphatically displays the noticed item moves to the position of one of the item icons of the lower hierarchy. Accordingly, the user can selectively determine a desired lower hierarchy item icon by operating the upward or downward direction indicating button and then operating the "determination" button of the remote controller transmitter 23. It is to be noted that any lower hierarchy item may include a further lower hierarchy.

In the present embodiment, in order to select an item icon in the item icon array 200, the user operates the upward or downward direction indicating operation button of the remote controller transmitter 23 to move a plurality of item icons in the vertical direction of the screen 19D to search for the item icon of a desired item.

Incidentally, the items represented by the item icons belonging to the category of a broadcasting medium in the present embodiment are function completion items composed of utility items and broadcasting channel items as shown in FIG. 2.

Here, the utility items shown above the category titles of the broadcasting media in FIG. 2 are EPG items, and preferably, they can be selected simply on the graphical user interface so that they can be referred to immediately upon channel selection.

Therefore, in the present embodiment, when one of the category icons 44 to 46 of the broadcasting media is selected, the channel item icons in the item icon array 200 are moved upwardly or downwardly one by one, but when the noticed item icon is to be selected with regard to a channel item, the item icons of the utility items above the category icons 44 to 46 are not moved in the upward or downward direction while only the item icons of the function completion items below the category icons 44 to 46 are moved in the upward or downward direction. This similarly applies to the item icon array with regard to the category icon 47.

It is to be noted that, if an instruction to select one of the items above the channel item (uppermost channel item) immediately below any of the category icons 44 to 46 in FIGS. 4 to 6 is issued by the user, then the selection instruction becomes a selection instruction of a utility item, and an item icon of an EPG item is displayed as the noticed item icon in the noticed region 200C so that it can be selected.

Then, if the selection instruction operation range of the user changes to the range which indicates item icons of channel items from an item icon in the EPG item range, then the icons of those channel items positioned higher in the array direction than the item icon of the channel item displayed in the noticed region 200C as the noticed item icon successively disappear from the screen display as the item icons of the channel items move downwardly in the array direction.

Figure 8:
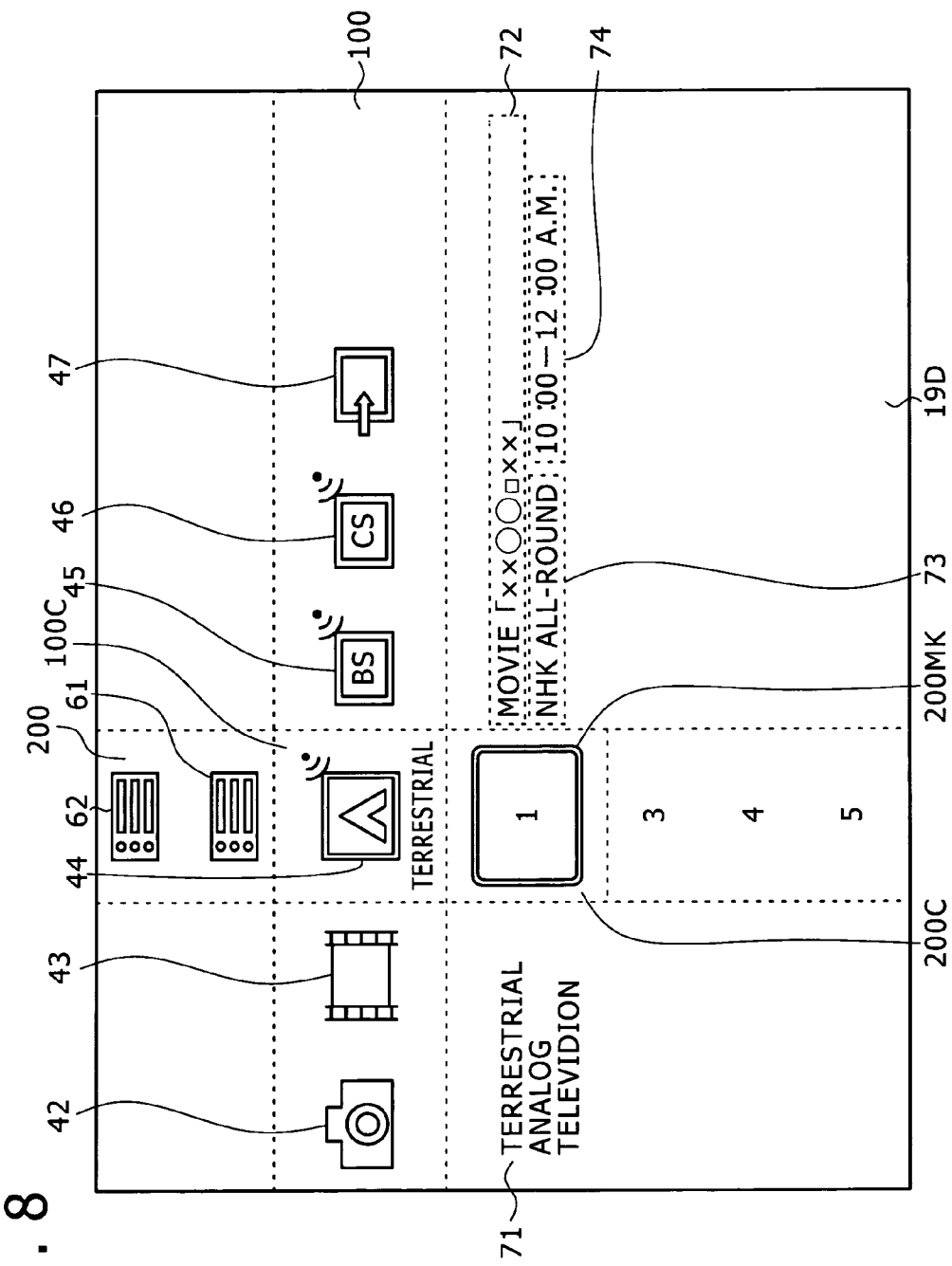

FIG. 8 shows an initial menu screen of the graphical user interface screen where the "terrestrial broadcasting" category icon 44 is the selected category.

As seen in FIG. 8, on the screen shown, each of the broadcasting channel items is represented by an icon composed of a channel number. In the example of FIG. 8, the broadcasting channel of the channel number "1" is surrounded by the quadrangular framework 200MK and displayed in the noticed region 200C, thereby indicating that the channel "1" is selected.

Further, above the category icon, item icons 61 and 62 where the EPG function is a utility item are displayed. In the example shown in FIG. 8, the item icon 61 represents the EPG function for the terrestrial analog television broadcasting, and the item icon 62 represents the EPG function for the terrestrial digital television broadcasting.

Then, on the graphical user interface screen on which any of the category icons of the broadcasting media is selected, when the noticed item icon is an item icon of a channel item, the name of the group to which the selected noticed item icon belongs is displayed in a group name displaying place 71 on the left side of the noticed item icon of the noticed region 200C. In the example of FIG. 8, "terrestrial analog television" is displayed in the group name displaying place 71.

On the other hand, on the graphical user interface screen on which one of the category icons of the recording media is selected, when the noticed item icon is an item icon of a channel item, in the example shown, explanation information for two lines is displayed on the right side of the noticed item icon of the noticed region 200C.

The higher line of the explanation information in the two lines is set as a program name displaying place 72, in which a broadcasting program name of the channel of the noticed item icon is displayed. Meanwhile, the lower side line includes a broadcasting station name displaying place 73 and a broadcasting time displaying place 74 in which a broadcasting station name and the broadcasting time (starting time and ending time) of the channel of the noticed item icon are displayed, respectively.

Figure 9:
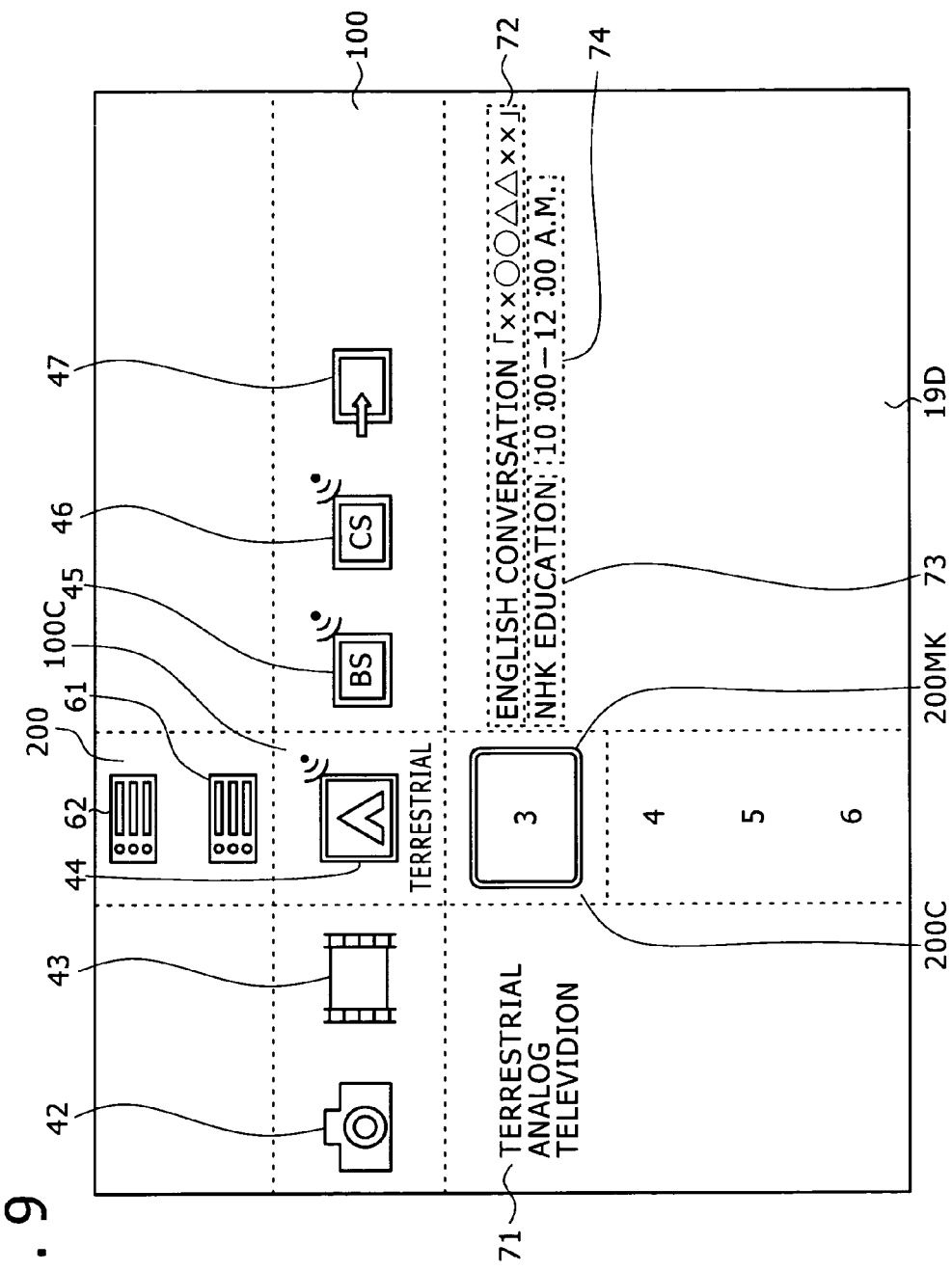

Then, if, in the state of FIG. 8, the user operates the downward direction indicating operation button of the upward and downward direction indicating operation buttons of the remote controller transmitter 23 in order to select a channel at a downward portion in the array direction of the channel numbers, then the display substance of the screen changes as seen in FIG. 9. In particular, the noticed item icon of the noticed region 200C changes to that of the channel "3" of the terrestrial analog television broadcasting and the item icon of the channel "1" disappears from the screen. At this time, the item icons 61 and 62 of the EPG items which are utility items are displayed without changing the position thereof on the screen 19D.

Further, if an item icon of a channel item at a lower portion in the channel array direction is selected, then the screen changes similarly.

Figure 10:
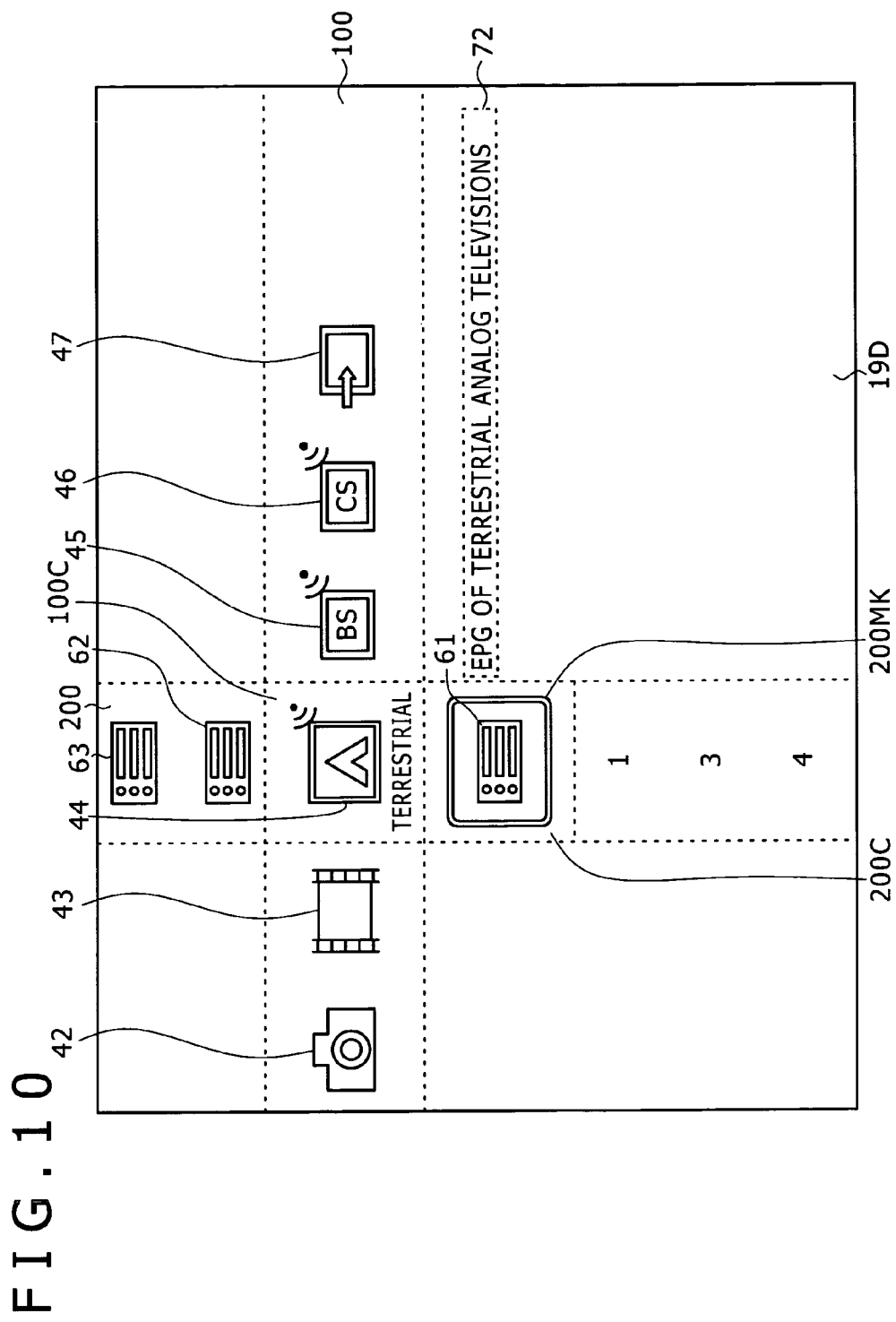

On the contrary, if the user operates the upward direction indicating operation button of the upward and downward direction indicating operation buttons of the remote controller transmitter 23 in order to select a channel at an upper portion in the array direction of the channel numbers, then the display substance of the screen changes as seen in FIG. 10. In particular, the noticed item icon of the noticed region 200C changes to an item icon of an EPG function of the terrestrial analog television broadcasting, and explanation of this is displayed in a program name displaying place 72.

Here, if the "determination" button is depressed in this state, then in the broadcasting reception apparatus, corresponding EPG data is read out from the display data storage section 29 to produce EPG display data. Then, the graphical user interface is erased and the produced and selectively determined EPG screen is displayed on the screen 19D of the monitor display unit 19.

Further, in the present embodiment, taking it into consideration that the number of channel items of the broadcasting media is great, a scrolling search can be performed upon selection of an item icon in the item icon array 200.

Although the operation button for such a scrolling search may be provided separately on the remote controller transmitter 23, in the present embodiment, it is determined that a scrolling starting operation is performed when the upward direction indicating operation button or the downward direction indicating operation button of the upward and downward direction indicating operation buttons of the remote controller transmitter 23 is kept depressed for more than a fixed period of time, and while the upward direction indicating operation button or the downward direction indicating operation button is kept depressed, the scrolling is continued.

Then, in the present embodiment, while the scrolling continues, the scrolling speed increases gradually. Further, in the present embodiment, the display substance of the graphical user interface screen changes in response to the scrolling speed so that the user can perform the search more readily.

Figure 11:
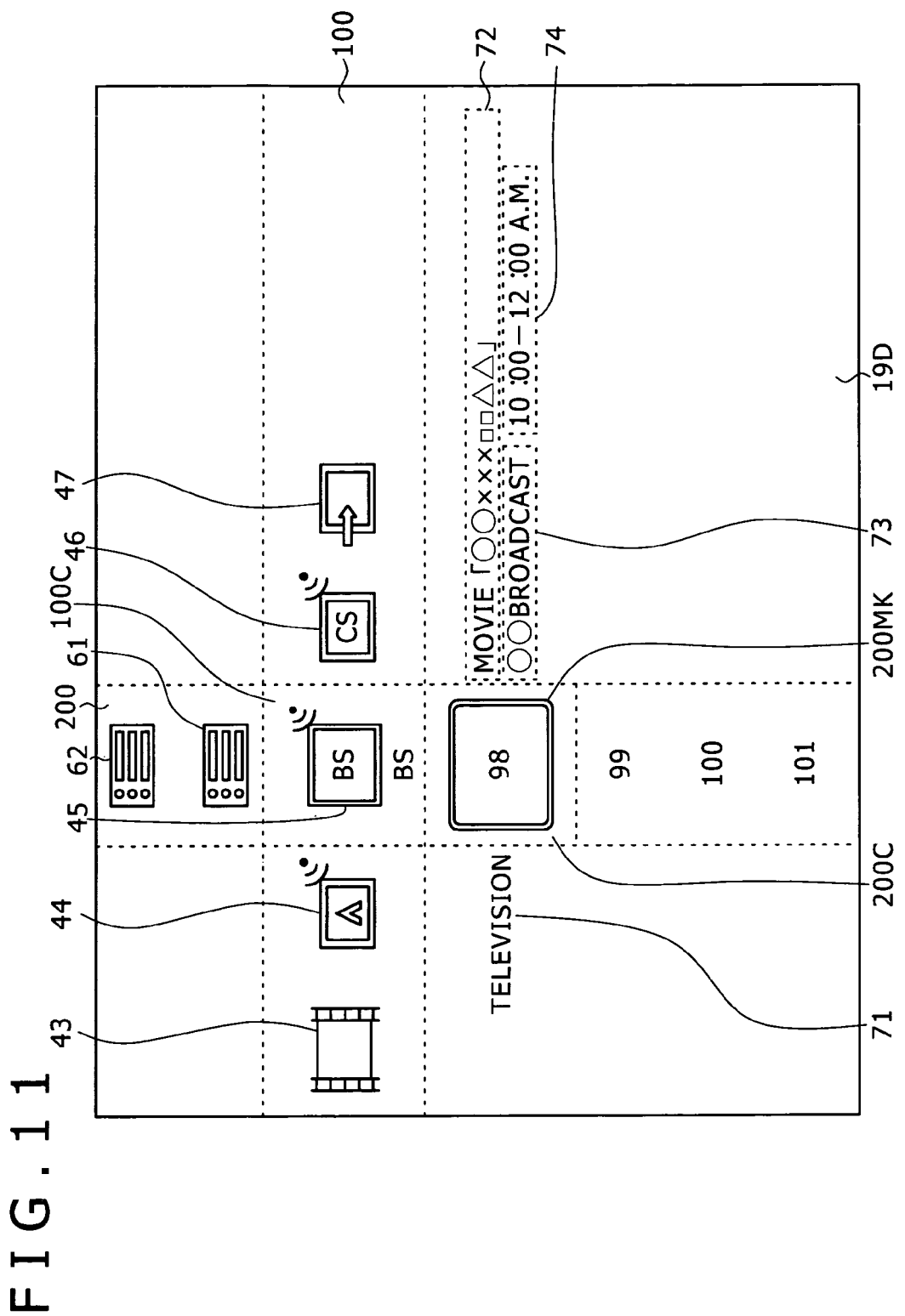

A manner of such change of the screen 19D upon scrolling is described with reference to FIGS. 11 to 14. FIG. 11 illustrates a manner wherein, while the category icon 45 of the BS broadcasting media is selected, the item icon of the channel 98 of the television is selected as the noticed item icon. The display of FIG. 11 is similar to that of FIG. 8 described hereinabove but is different in that the broadcasting media change from the terrestrial broadcasting media to the BS broadcasting media.

Figure 12:
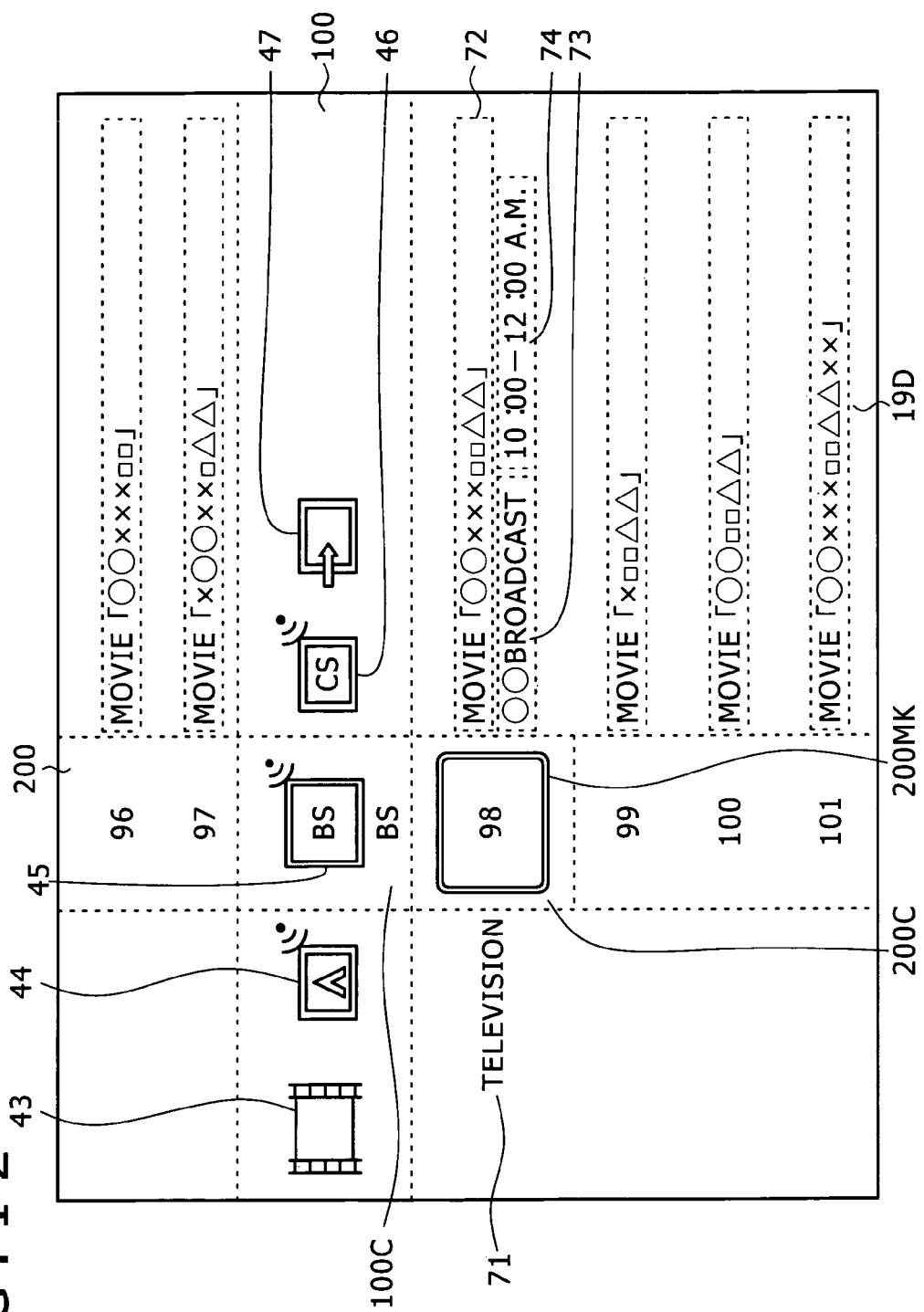
FIGS. 12 to 15 are schematic views showing different examples of the graphical user interface upon scrolling in the broadcast reception apparatus of FIG. 1.

If, in the state of FIG. 11, the user depresses, for example, the downward direction indicating operation button of the remote controller transmitter 23 for more than a fixed period of time to perform the scrolling starting operation, then the graphical user interface screen changes to such a manner as seen in FIG. 12.

In particular, on the original screen of FIG. 11, explanation of the selected channel is displayed on the right side only with regard to the noticed item icon of the noticed region 200C. However, in FIG. 12, explanation not only with regard to the noticed item icon of the noticed region 200C but also with regard to a plurality of channels preceding to and following the channel selected as the noticed item icon is displayed.

In particular, on the original screen of FIG. 11, although the channel numbers of a plurality of channels following the channel selected through the noticed item icon of the noticed region 200C are displayed in the item icon array 200, explanation of the program names of the channels and so forth is not displayed. Thus, also such explanation as just mentioned is displayed.

Further, on the original screen of FIG. 11, item icons of channel items preceding to the selected noticed item ion are not displayed above the category icon 45 because item icons of EPG items are displayed above the category icon 45 as described above. However, on the graphical user interface screen of FIG. 12 after the scrolling is started, the item icons of the EPG items disappear, and also item icons of channels preceding to the channel corresponding to the noticed item icon are displayed.

Consequently, the user can easily find out a desired channel item by scroll search.

However, in the present embodiment, although all of the program name displaying place 72, broadcasting station name displaying place 73 and broadcasting time displaying place 74 are displayed with regard to the noticed item icon as seen in FIG. 12, with regard to the item icons preceding to and following the noticed item icon, the substance is displayed only in some of the program name displaying place 72, broadcasting station name displaying place 73 and broadcasting time displaying place 74. In the example of FIG. 12, only a program name is displayed in the program name displaying place 72. In particular, in the present embodiment, also on the scrolling screen, explanation information regarding the noticed item icon is displayed emphatically and details are displayed. However, explanation information regarding the item icons other than the noticed item icon to be displayed simultaneously is limited to part of the explanation information regarding the noticed item icon.

The reason why such a displaying manner of explanation information as just described is adopted is that, even if a large number of types of information are provided for an image moving at a high speed in the scrolling display, the information cannot be recognized readily and, if it is tried to display a large number of kinds of information, then each piece of information can be displayed only finely and cannot be recognized readily.

It is to be noted that, in the present embodiment, the explanation display is performed such that, where it is positioned on the right side of the noticed item icon, it is displayed densely or displayed in a different color from the other displays such as, for example, in bright yellow so that it can be distinguished from the other item icons displayed thinly, for example, in white characters. Further, it is common to all of the graphical user interface screens used in the present embodiment that a reproduction image of the background can be generally observed through the graphical user interface screen.

Further, on the left side of the noticed item icon, the group name to which the channel corresponding to the noticed item icon belongs is displayed. However, this group name may not be displayed at this stage. Further, in FIG. 12, the category icon array 100 is displayed thinly so that it can be emphasized that the item icons are being scrolled.

Figure 13:
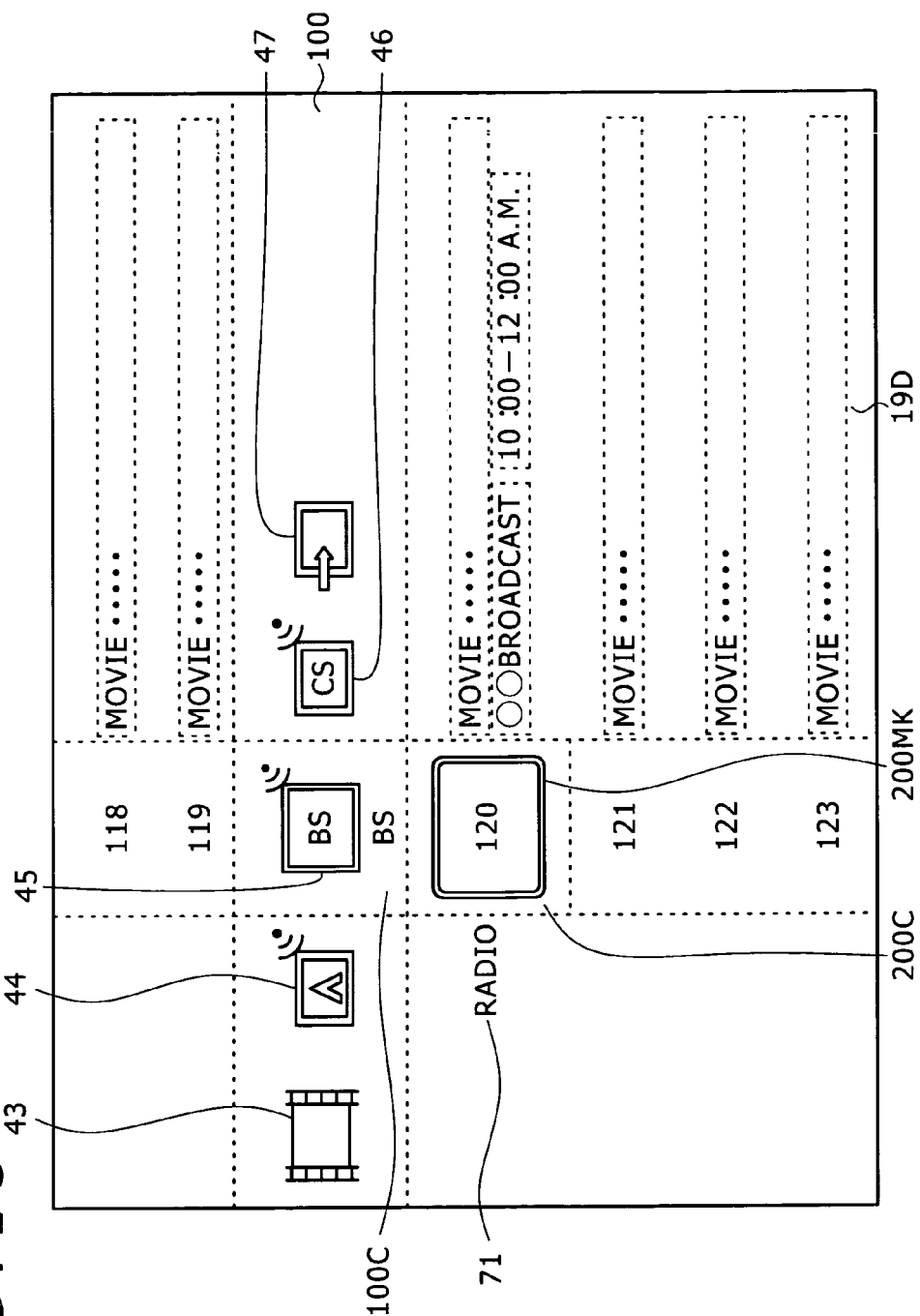

If the depression state of the downward direction indicating operation button of the remote controller transmitter 23 is further continued in this state, then the broadcasting reception apparatus decides that the scrolling is continued and gradually raises the scrolling speed. As the scrolling speed gradually rises, the item icon formed from a channel number surrounded by the quadrangular framework 200MK is displayed densely so as to be emphasized as shown in FIG. 13. However, the explanation displays are all displayed thinly similarly to the other item icons. At this time, only the explanation information of the noticed item icon may be kept densely or may be displayed more densely than the other explanation displays so that it can be noticed.

Figure 14:
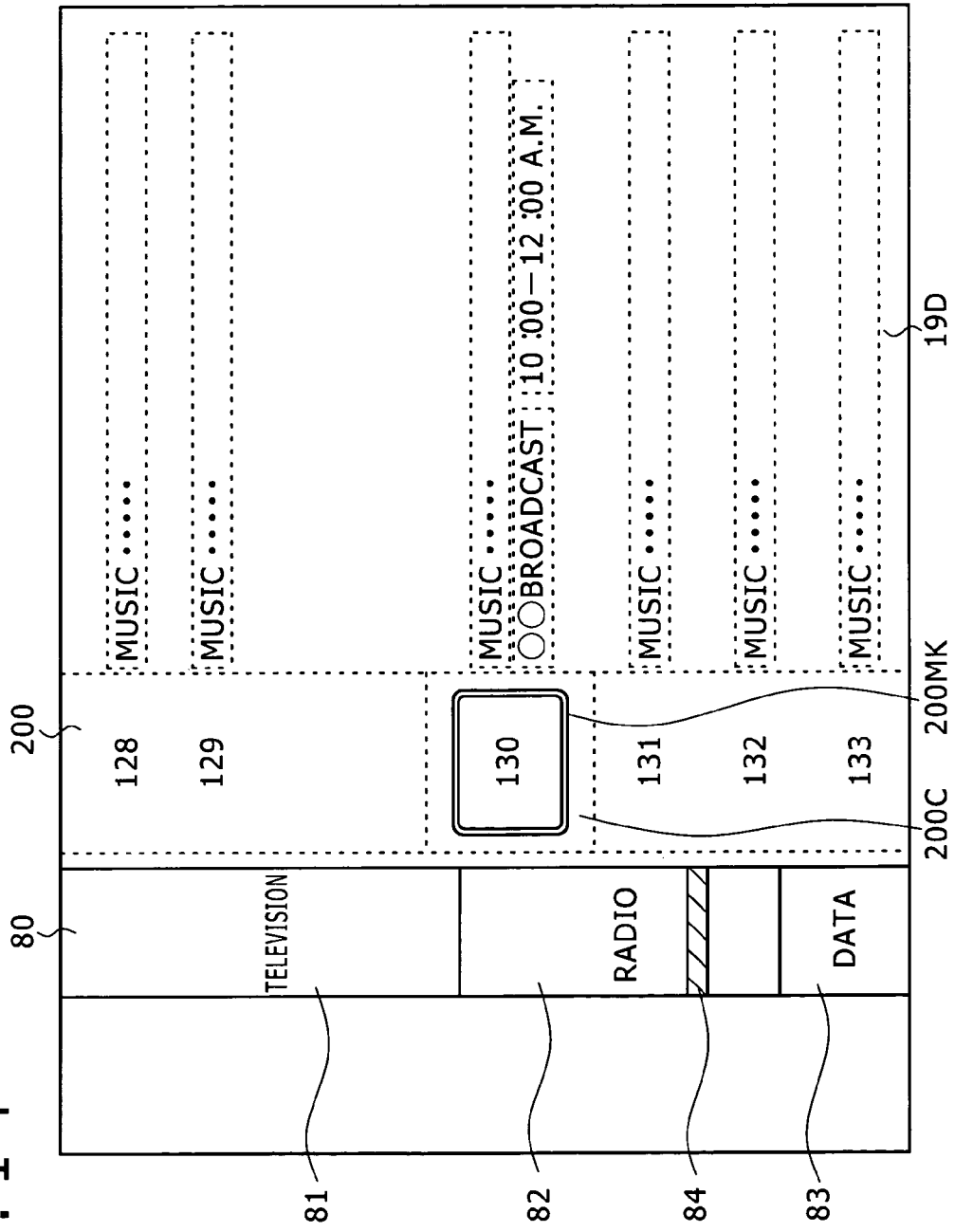

If the scrolling further continues until the scrolling speed exceeds a predetermined value, then a group bar 80 having a predetermined width in the horizontal direction and extending over the overall extent of the screen 19D in the vertical direction is displayed on the left side of the noticed item icon of the item icon array 200 which is surrounded by the quadrangular framework 200MK and displayed densely so as to be emphasized as shown in FIG. 14. Further, in the present example, the category icon array 100 is erased on the screen of FIG. 14. However, also on the screen of FIG. 14, the category icon array 100 may otherwise be kept displayed but thinly without being erased.

The group bar 80 is displayed so as to correspond to the array order of the channels of the individual broadcasting medium described hereinabove with reference to FIGS. 4 to 6. Thus, the group bar 80 is divided in the vertical direction in accordance with the set group such that the individual divided portions have lengths corresponding to the number of channels included in the groups. Since the example of FIG. 14 illustrates the group bar 80 of the BS broadcasting, the group bar 80 is divided into three regions of divisional regions 81, 82 and 83 in accordance with the grouping of FIG. 5, and the group name is displayed at the bar portion of each of the divisional regions 81, 82 and 83. Further, the group bar 80 displays a noticed item icon position display mark 84 indicative of the group and the position of the channel in the group bar 80 represented by the noticed item icon.

The noticed item icon position display mark 84 is displayed using a color which looks conspicuously to the user on the graphical user interface screen, for example, using bright yellow similarly to the quadrangular framework 200MK for emphatically displaying the noticed item icon.

Consequently, even if the scrolling speed becomes so high that the noticed item icon displayed on the screen and item icons preceding to and following the noticed item icon as well as the explanation displays of them cannot be observed well, it can be recognized readily from the position of the noticed item icon position display mark 84 of the group bar 80 which channel position is being currently scrolled.

In the present embodiment, scrolling is possible not only upon selection of a channel item when the selected category icon is the category icon of any broadcasting medium but upon selection of an item icon belonging to all of the seven different category icons.

However, in the present embodiment, the selection for the array of item icons in the item icon array 200 is not of the ring type. In particular, after change of the selection of an item icon comes to the upper end or lower end of the item icon array, this cannot be performed any more in the same direction, but can be performed only in the reverse direction. Accordingly, also in the scrolling, after it comes to the upper or lower end of the array of item icons in the item icon array 200, it is stopped there. Therefore, where the number of items is small, even if the screen change to the scroll starting screen of FIG. 12 occurs, the scrolling may be stopped without changing to the screen of FIG. 13 or 14.

Naturally, however, the scrolling described above can be applied also where the upper end and the lower end of the item icon array are coupled to each other in the change of the selection of an item icon so as to allow ring-lie selection.

[Processing Action on the Graphical User Interface]

Now, processing action on the graphical user interface is described with reference to flow charts of FIGS. 15 to 18 particularly in connection with processing action of the control section 1 which controls the behavior on the graphical user interface described above. It is to be noted that, in the following description, the initial menu screen including the category icon array 100 and the item icon array 200 is referred to as "cross-shaped menu".

Further, while, in the foregoing description, when item icons of a lower hierarchy of an item icon are displayed, explanation information regarding all of the item icons of the lower hierarchy is displayed together, in the following description, also with regard to the item icons of the lower hierarchy, explanation information only of the noticed item icon among them is displayed initially, and only when a scroll starting instruction is issued, explanation information of all of the item icons is displayed similarly to the item icons of the first hierarchy.

The broadcasting reception apparatus of the present embodiment is configured such that, after a main power supply switch is switched on, every time the power supply key of the remote controller transmitter 23 is depressed, the broadcasting reception apparatus repeats changeover between a state wherein the power supply is on and a standby state wherein the power is available only to those elements necessary to restore the state wherein the power supply is on. Then, when the power supply key is operated in the standby state to switch on the power supply, the broadcasting reception apparatus builds up to restore a state (last state) at a point of time immediately before the standby state is entered.

Further, in the following description, operation of the power supply key and the various buttons is performed on the remote controller transmitter 23 by the user, and the control section 1 supervises a signal from the remote controller reception section 24 to detect a key or button operated on the remote controller transmitter 23. However, for simplified description, such an expression that the control section 1 detects an operation of a key or button is used in the following description.

Figure 15:
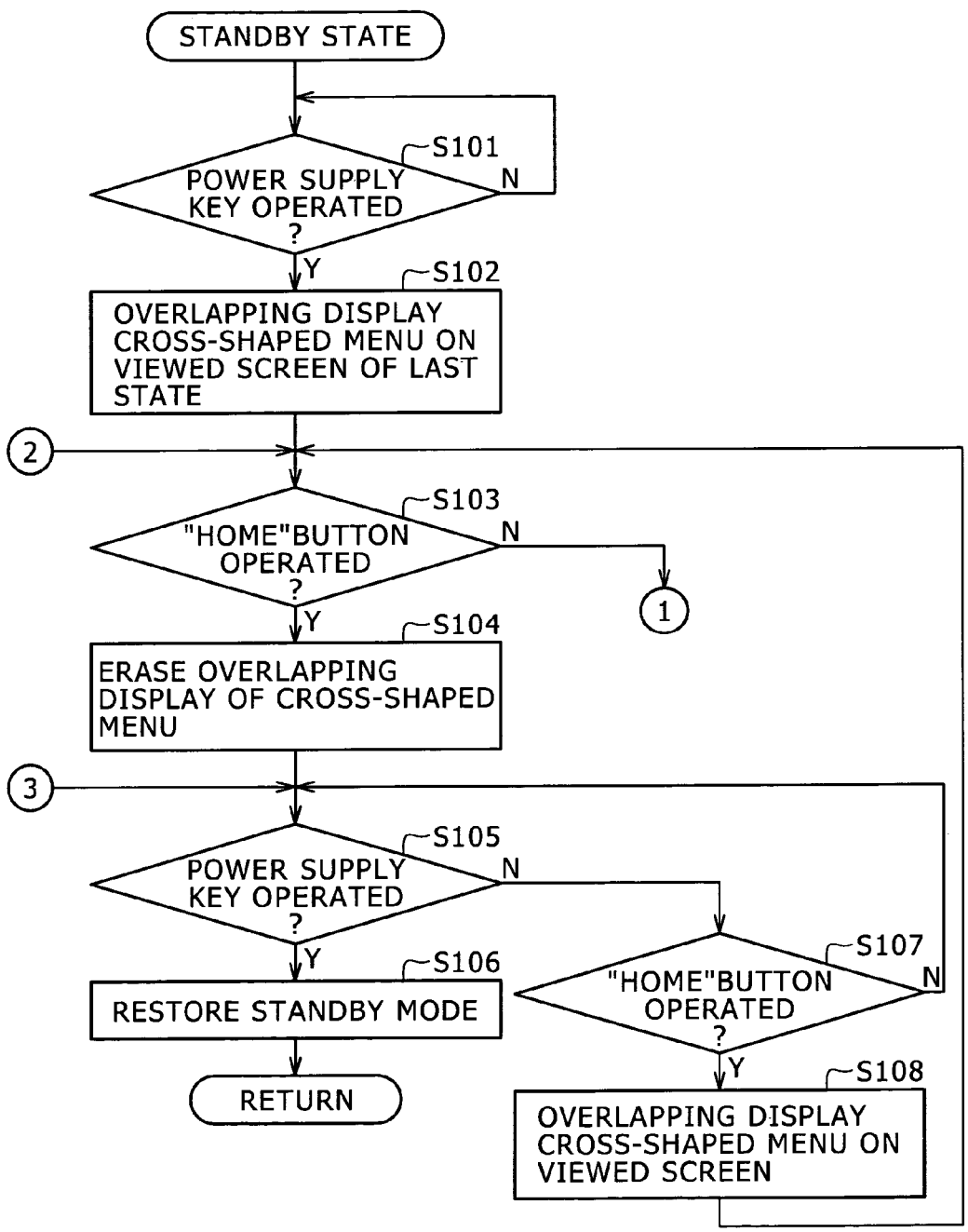

When the broadcasting reception apparatus of the present embodiment is in the standby state, the control section 1 normally supervises an operation input of the power supply key as seen in FIG. 15 (step S101). Then, if it is detected at step S101 that the power supply key is operated, then the control section 1 displays the screen of the last state on the screen 19D of the monitor display unit 19 and displays the cross-shaped menu in an overlapping relationship (step S102).

Then, the control section 1 decides whether or not the "home" button is operated by the user (step S103). If it is decided that the "home" button is depressed, then the control section 1 erases the overlapping display of the cross-shaped menu on the screen 19D (step S104).

Then, the control section 1 supervises an operation input of the power supply key again (step S105). Then, if an operation of the power supply key is detected, then the control section 1 stores the last state and restores the standby state (step S106), thereby ending the processing routine.

On the other hand, if it is decided at step S105 that the power supply key is not operated, then the control section 1 decides whether or not the "home" button is operated (step S107). If it is decided that the "home" button is not operated, then the processing returns to step S105. On the other hand, if it is decided at step S107 that the "home" button is operated, then the control section 1 displays the cross-shaped menu screen in an overlapping relationship on the screen 19D of the monitor display unit 19 being viewed (step S108). The processing thereafter returns to step S103.

Figure 16:
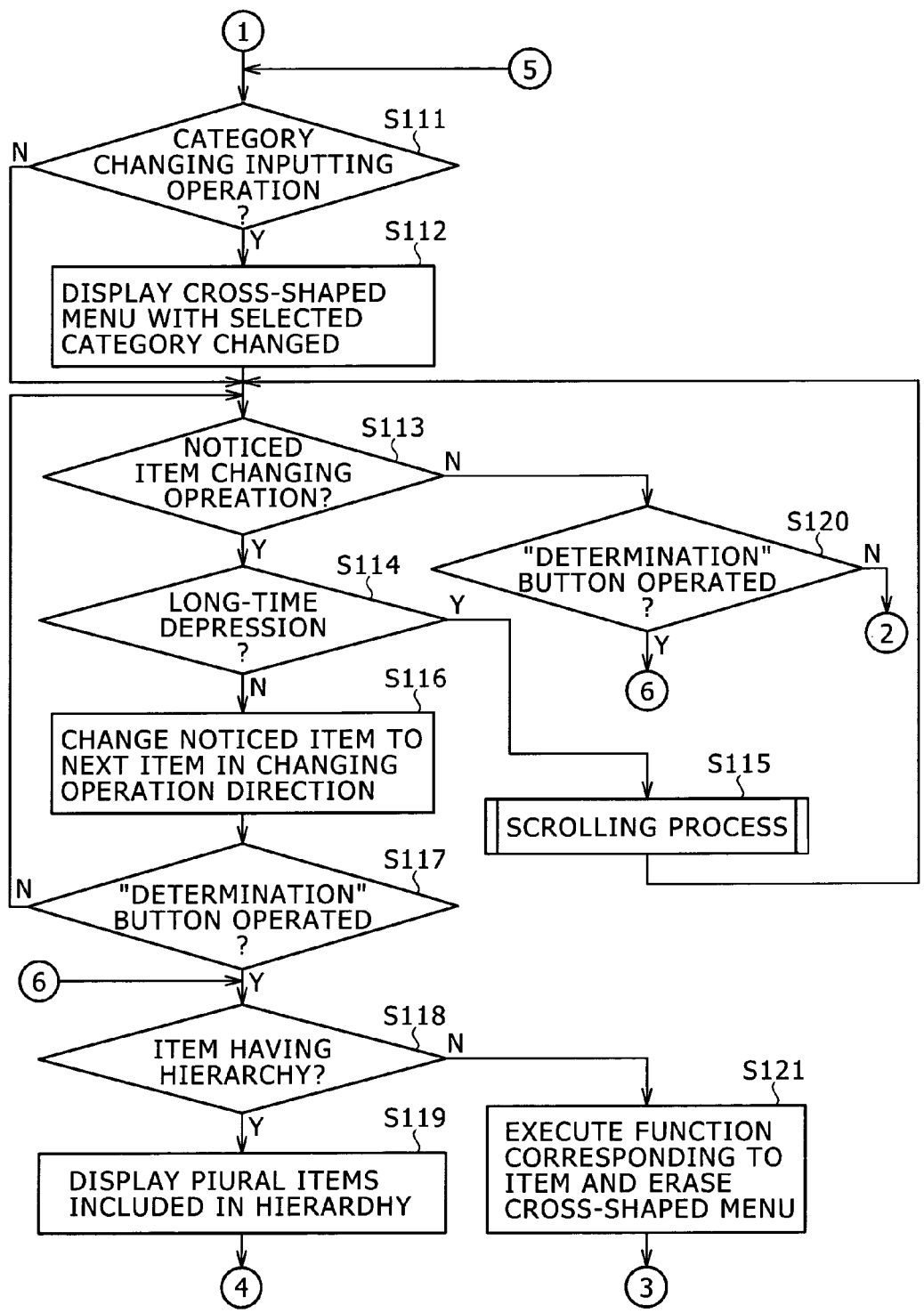
FIGS. 16 to 17 are flow charts illustrating processing action on the graphical user interface in the broadcast reception apparatus of FIG. 1.

Then, if it is decided at step S103 that the "home" button is not operated, then the control section 1 decides whether or not a category changing inputting operation by the leftward or rightward direction indicating operation button of the remote controller transmitter 23 is performed on the graphical user interface screen formed from the cross-shaped menu being displayed in an overlapping relationship (step S111 of FIG. 16).

If it is decided at step S111 that a category changing inputting operation is performed on the cross-shaped menu screen displayed in an overlapping relationship, then the control section 1 controls the display image producing and outputting section 30 to change the selected category icon to that according to the changing instruction of the user on the cross-shaped menu screen and change the item icon array 200 so that it may be formed from those item icons which belong to the changed category icon. At this time, the control section 1 recognizes the category corresponding to the selected category icon as a selected category (step S112).

If it is decided at step S111 that no category changing inputting operation is performed or after a process of changing the selected category is performed at step S112, the processing advances to step S113. At step S113, the control section 1 decides whether or not the upward direction indicating operation button or the downward direction indicating operation button of the remote controller transmitter 23 is operated thereby to decide whether or not an operation for changing the noticed item icon in the noticed region 200C of the item icon array 200 of the cross-shaped menu is performed.

Then, if it is decided at step S113 that one of the upward direction indicating operation button and the downward direction indicating operation button of the remote controller transmitter 23 is operated, then the control section 1 decides whether or not the button operation is a long-time operation which is a state wherein the button operation continues for more than a predetermined period of time (step S114). If it is decided that the button operation is a long-time operation, then the control section 1 performs a scrolling process hereinafter described (step S115). Thereafter, the processing returns to step S113.

On the other hand, if it is decided at step S114 that the button operation is not a long-time operation, then the control section 1 controls the display image producing and outputting section 30 to change the noticed item icon, which is to be displayed in the noticed region 200C on the cross-shaped menu, to an item icon adjacent in the direction of the changing operation to the noticed item icon at present and determine an item corresponding to the item icon displayed newly in the noticed region 200C as a noticed item (step S116).

Then, the control section 1 decides whether or not the "determination" button is operated on the remote controller transmitter 23 (step S117). If it is decided that the "determination" button is not operated, then the processing returns to step S113 so that the processes at the steps beginning with step S113 described above are repeated.

On the other hand, if it is decided at step S117 that the "determination" button is operated, then the control section 1 decides whether or not the determined item has lower hierarchy items (step S118). If it is decided that the determined item has no lower hierarchy items, then the control section 1 erases the cross-shaped menu from the screen 19D and executed a function or process of the item which is currently regarded as the noticed item (step S121). Thereafter, the processing advances to step S105 of FIG. 15 so that the processes at the steps beginning with step S105 described hereinabove are repeated.

On the other hand, if it is decided at step S118 that the determined item has lower hierarchy items, then the control section 1 controls the display image producing and outputting section 30 to display a plurality of ones of the lower hierarchy items of the notice item on the screen 19D (step S119). This state corresponds to the state wherein the "determination" button is depressed while the item icon of recording reservation is selected as the noticed item icon, and the display of the screen 19D at step S119 is, for example, such display as shown in FIG. 7.

Then, the control section 1 decides whether or not the upward direction indicating operation button or the downward direction indicating operation button of the remote controller transmitter 23 is operated on the display screen of the lower hierarchy items to decide whether or not a changing operation of the noticed item icon of the lower hierarchy surrounded by the quadrangular framework 200MK is performed (step S131).

Then, if it is decided at step S131 that one of the upward direction indicating operation button and the downward direction indicating operation button of the remote controller transmitter 23 is depressed, then the control section 1 decides whether or not the button operation is long-time depression wherein the button operation continues for more than a predetermined period of time (step S132). Then, if it is decided that the button operation is long-time depression, then the control section 1 performs a scrolling process hereinafter described (step S135). Thereafter, the processing returns to step S131.

On the other hand, if it is decided at step S132 that the button operation is not long-time depression, then the control section 1 controls the display image producing and outputting section 30 to change the noticed item icon of the lower hierarchy surrounded by the quadrangular framework 200MK to an adjacent item icon next in the changing operation direction of the noticed item icon at present to determine an item corresponding to the item icon displayed newly in the region surrounded by the quadrangular framework 200MK as a noticed item (step S133).

Then, the control section 1 decides whether or not the "determination" button is operated on the remote controller transmitter 23 (step S134). If it is decided that the "determination" button is not operated, then the processing returns to step S131 so that the processes at the steps beginning with step S131 described above are repeated. On the other hand, if it is decided at step S134 that the "determination" button is operated, then the processing returns to step S118 of FIG. 16 so that the processes at the steps beginning with step S118 described hereinabove are repeated.

On the other hand, if it is decided at step S131 that none of the upward direction indicating operation button and the downward direction indicating operation button of the remote controller transmitter 23 is operated, then the control section 1 decides whether or not the "return" button is operated on the remote controller transmitter 23 (step S136). If it is decided that the "return" button is operated, then the control section 1 controls the display image producing and outputting section 30 so that the overlapping display of the cross-shaped menu is returned to the state of the immediately preceding screen (step S137). Then, the processing returns to step S111 of FIG. 16 so that the processes at the steps beginning with step S111 are repeated.

On the other hand, if it is decided at step S136 that the "return" button is not operated, then the control section 1 decides whether or not the "home" button is operated (step S138). If it is decided that the "home" button is depressed, then the control section 1 erases the overlapping display of the cross-shaped menu on the screen 19D (step S139). Then, the processing advances to step S105 of FIG. 15 so that the processes at the steps beginning with step S105 are performed.

On the other hand, if it is decided at step S138 that the "home" button is operated, then the control section 1 returns the processing to step S131 to repeat the processes at the steps beginning with step S131.

Then, if it is decided at step S113 of FIG. 16 that none of the upward direction indicating operation button and the downward direction indicating operation button of the remote controller transmitter 23 is operated, then the control section 1 decides whether or not the "determination" button is operated on the remote controller transmitter 23 (step S120). If it is decided that the "determination" button is not operated, then the processing returns to step S103 of FIG. 15 so that the processes at the steps beginning with step S103 described hereinabove are repeated.

Figure 17:
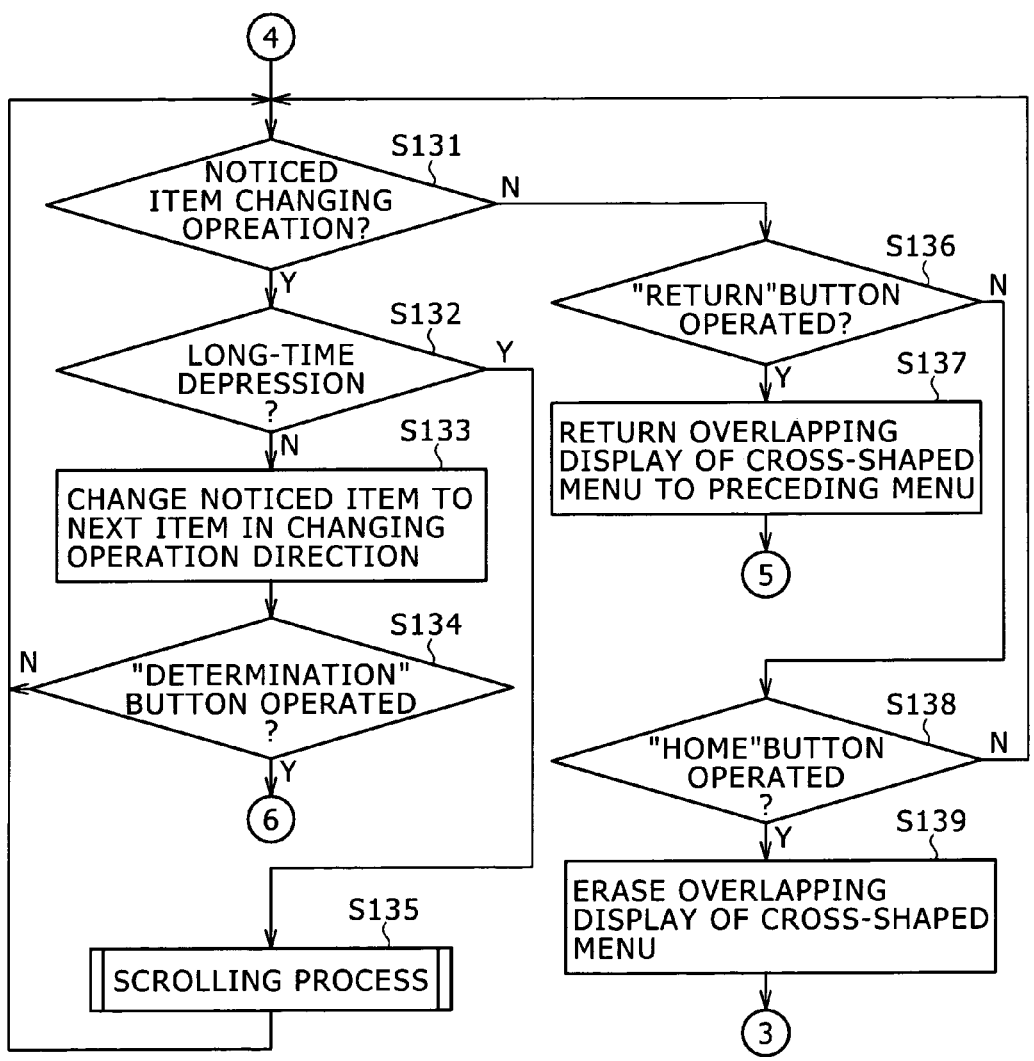

Now, the scrolling process at step S115 of FIG. 16 or at step S135 of FIG. 17 is described with reference to FIG. 18.

Figure 18:
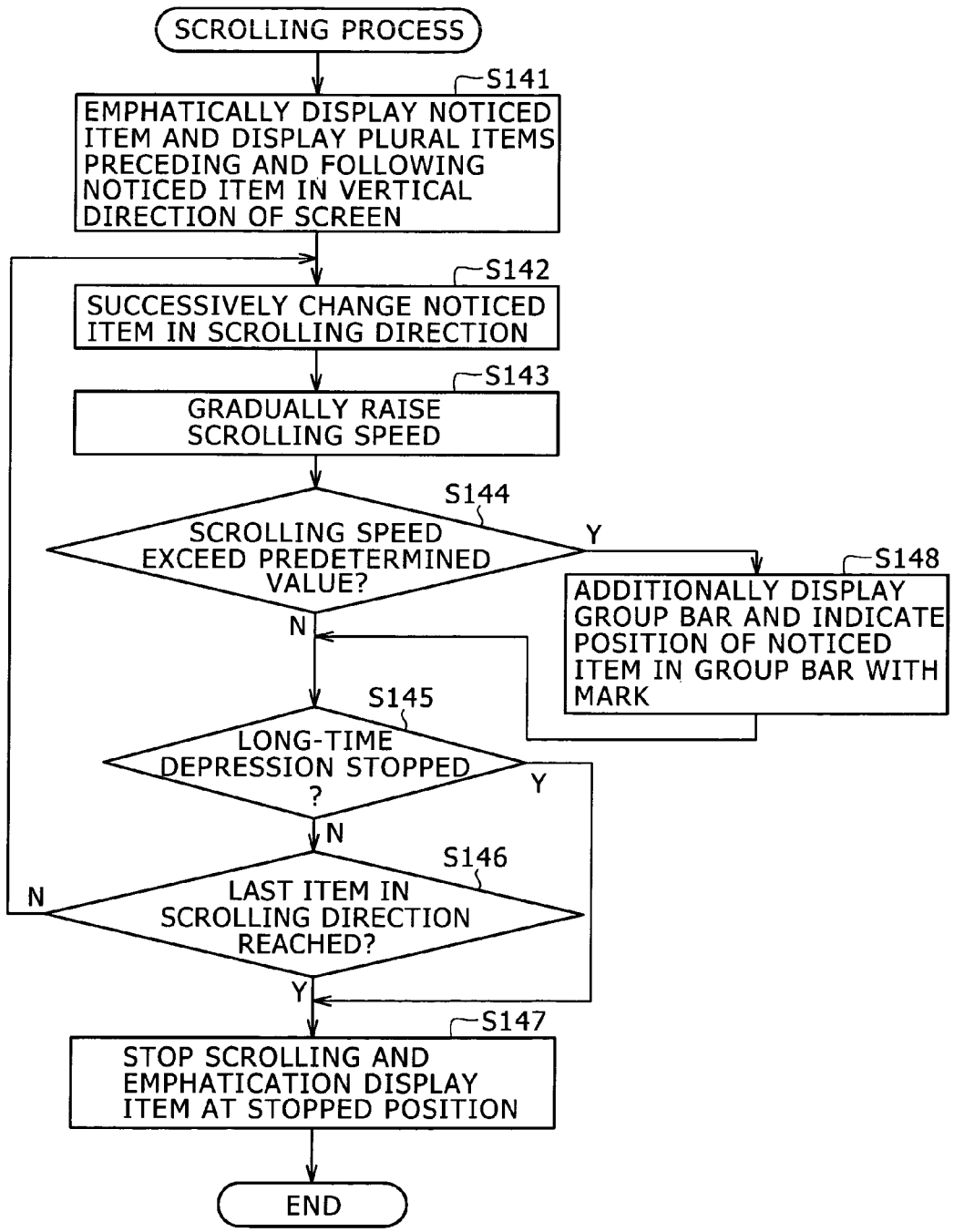
FIG. 18 is a flow chart illustrating scrolling processing action on the graphical user interface in the broadcast reception apparatus of FIG. 1.

As described hereinabove, the processing routine of FIG. 18 is started when long-time depression of the upward direction indicating operation button or the downward direction indicating operation button, which is regarded as a scrolling starting operation, is performed on the remote controller transmitter 23.

After the scrolling starting operation described above is detected, the control section 1 controls the display image producing and outputting section 30 to start scrolling in such a state that explanation information not only of the noticed item icon but also of item icons preceding to and following the noticed item icon are displayed as seen in FIG. 12 (step S141). Then, the control section 1 successively changes the noticed item icon in the indicating direction of the operated button (step S142).

Then, the control section 1 controls the display image producing and outputting section 30 to gradually raise the scrolling speed and control the density of the display of the cross-shaped menu screen in accordance with the scrolling speed as seen on the graphical user interface screen of FIG. 13 described hereinabove (step S143).

Thereafter, the control section 1 decides whether or not the scrolling speed exceeds a predetermined speed (step S144). If it is decided that the scrolling speed does not exceed the predetermined speed, then the control section 1 decides whether or not the long-time depression of the upward direction indicating operation button or the downward direction indicating operation button is stopped (step S145). If it is decided that the long-term depression is not stopped, then the control section 1 decides whether or not the last item in the scrolling direction is reached (step S146).

If it is decided at step S145 that the long-time depression is stopped, or if it is decided at step S146 that the last item in the scrolling direction is reached, then the control section 1 stops the scrolling and displays a cross-shaped menu screen on which the item at which the scrolling stops is displayed emphatically (step S147), thereby ending the processing.

If it is decided at step S144 that the scrolling speed exceeds the predetermined speed, then the control section 1 controls the display image producing and outputting section 30 to additionally display the group bar 80 on the screen 19D as seen on the graphical user interface screen of FIG. 14 and display the noticed item icon position display mark 84 indicative of the group and the position of the noticed item icon in the group bar 80 (step S148). Then, the processing advances from step S148 to step S145.

In this manner, since, in the present embodiment, upon scrolling, not only explanation information of the noticed item icon is displayed but also explanation information of item icons preceding to and following the noticed item icon is displayed, the user can perform a scrolling search readily.

Further, in the present embodiment, as the scrolling speed increases, the group bar 80 including the noticed item icon position display mark 84 appears on the scrolling screen so as to notify the user of the group and the position of the noticed item icon in the item icon array. Therefore, the user can perform scrolling search readily by referring to the group bar 80.

It is to be noted that, while, in the example described above, the scrolling is performed only within the range of the channel selection of the broadcasting media, the scrolling may otherwise be performed including also the utility items.

Further, while the group bar 80 is displayed when the predetermined scrolling speed is reached, it may otherwise be displayed at a starting point of time of scrolling.

Further, not the group bar but a bar which does not include group divisions corresponding to the item icon array may be displayed such that a noticed item icon position indicating mark representative of at which position the noticed item icon is displayed on the bar. In this instance, the group name to which the noticed item icon belongs may be displayed together at a suitable location on the display screen.

[Second Embodiment]

In the embodiment described above, the electronic apparatus is a broadcasting reception apparatus, and scrolling is performed for items in channel selection of the categories of the broadcasting media. Therefore, the items are classified into the groups of the television broadcasting, radio broadcasting and data broadcasting in advance. However, the present invention is not limited to the case described.

For example, the present invention can be applied also to a search for a broadcasting program content stored in a data storage apparatus of a large capacity such as a hard disk apparatus or a DVD (Digital Versatile Disc) drive where the data storage apparatus is provided in the broadcasting reception apparatus of the embodiment described hereinabove and is used to record and store data of broadcasting program contents.

In this instance, when the broadcasting reception apparatus stores data of a broadcasting program content into the data storage apparatus, it records information of the recording year, month, day and hour of the broadcasting program content and refers to EPG data to record, for example, the genre of the broadcasting program content.

Further, a category icon of the data storage media is added to the category icons in the embodiment described hereinabove, and a broadcasting program content is set as an item icon. The item icon is formed from a number such as, for example, a recoding number, and when it is selected as the noticed item icon, the broadcasting program name, broadcasting time, broadcasting station name and so forth are displayed as explanation information to be displayed on the left side of the item icon.

It is to be noted that, when the broadcasting program content is a television broadcasting program, a thumbnail image such as a title screen of the broadcasting program may be used as a representation image in place of an item icon.

Then, item icons or thumbnail images are grouped depending upon an attribute of the selection object items, in the present embodiment, depending upon the genre such as the movie, sports or news. In each group, the item icons or thumbnail images are arrayed in the order of the recording year, month, day and hour. In this instance, the order in the array may be any of the ascending order and the descending order in time, or may be set so as to be selected between them by the user.

In the present example, while the category icon of the data storage media is selected, the item icons or thumbnail images of the broadcasting program contents are displayed in the vertical direction of the screen 19D. Then, selection of a noticed item icon or a noticed thumbnail image is performed and scrolling is performed in a similar manner as in the embodiment described hereinabove.

Further, in the present example, when the scrolling speed exceeds a predetermined speed, the group bar 80 including the noticed item icon position display mark 84 is displayed. In this instance, in each of the divisional regions of the group bar 80, the genre name of the group of the divisional region is displayed.

It is to be noted that, for the genres used for grouping in this instance, all of the genres included in the EPG data may not be used, but the user may designate a plurality of particular genres such as, for example, "movie," "drama" or "sports". In this instance, broadcasting program contents are classified such that those to be recorded are grouped in accordance with the designated genres and any broadcasting program content which belongs to any genre other than the designated genres is classified into a group of "others".

Further, the reference for grouping where recorded broadcasting program contents are to be grouped is not limited to the genre. For example, it is possible for a user to designate particular several performers or players and classify broadcasting program contents in which the designated performers or players perform into groups of the individual performers or players. Also in this instance, any broadcasting program content in which only performers or players other than the designated performers or players perform is classified into a group of "others". Further, also in the present example, the performers or players in each group are arrayed in the order of the year, month, day and hour.

[Third Embodiment]

In the first and second embodiments described above, scrolling is performed for item icons or thumbnail image items immediately below the category icons on the cross-shaped menu screen. However, the present invention does not presuppose such a cross-shaped menu screen as described above but can be applied to all cases wherein a desired representation image is selected from among a plurality of representation images arrayed in one direction on a display screen and representing a plurality of selection object items.

Figure 19:
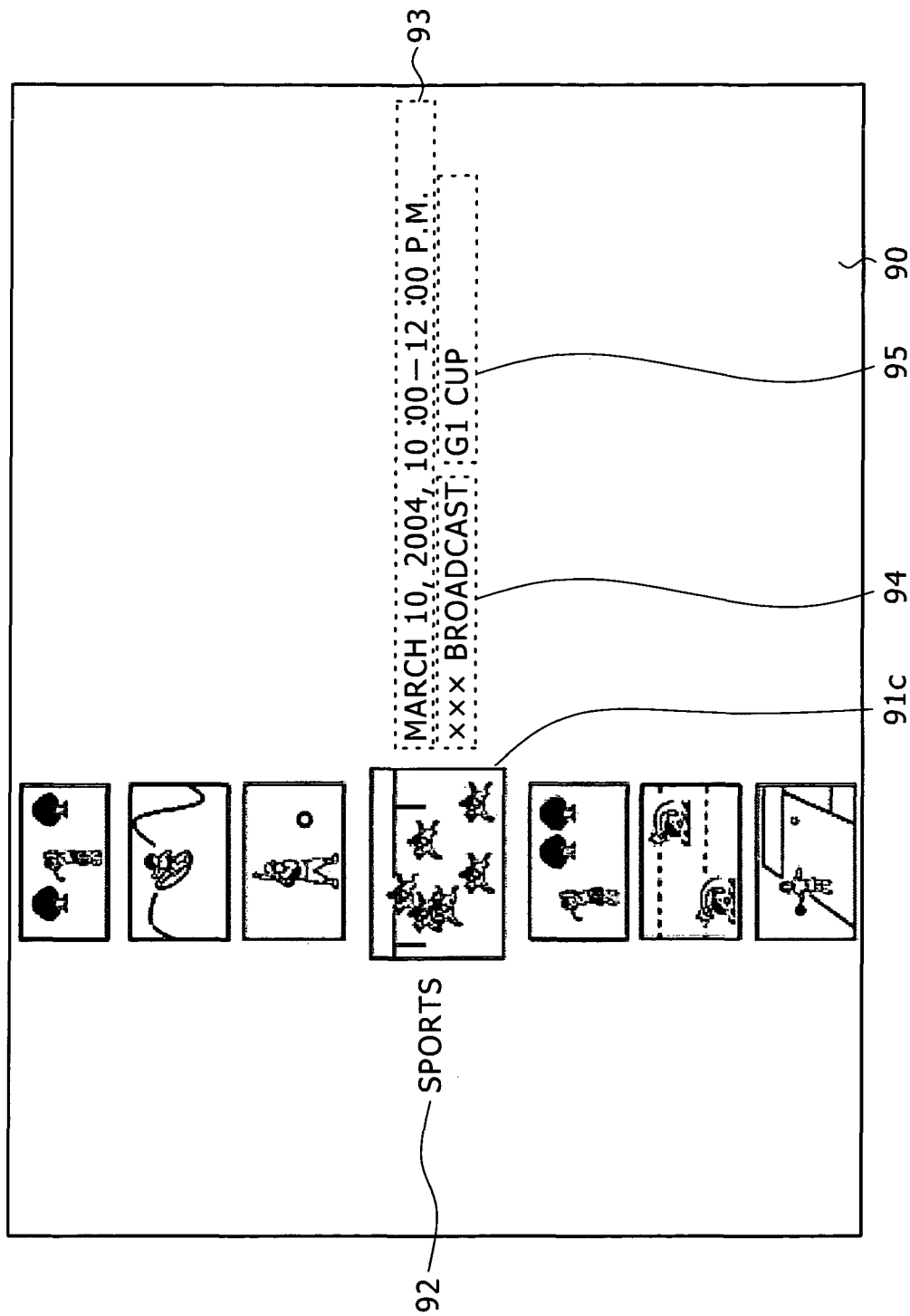
FIG. 19 is a schematic view showing an example of a graphical user interface screen to which the present invention is applied.

FIG. 19 shows an example of a recorded broadcasting program list screen which is displayed on a display screen 90 of a monitor display when a reproduction search button of a remote controller transmitter is operated on a recording and reproduction apparatus which has functions of storing data of broadcasting program contents on a content data storage section formed from a large capacity recording medium such as a hard disk and reading out data of a desired broadcasting program content from the content data storage section.

Also in the present embodiment, such graphical user interface screens as described above allow an image being reproduced to be displayed thinly in a visually observable state on a screen being reproduced.

In the example of FIG. 19, when the recording and reproduction apparatus stores data of a broadcasting program content on the content data storage section, it stores not only information of the year, month, day and hour of the storage but also information of groups classified based on grouping attributes set by a user in advance similarly as in the second embodiment.

For the grouping attributes, for example, the genres of broadcasting programs included in EPG data are used in the present example. Further, in the present example, the user can designate a genre or genres which are to be separated specially. Broadcasting program contents which belong to any other genre than the designated genre or genres are grouped into the other group. For the designation of a genre for grouping, a setting mode is prepared in the recording and reproduction apparatus of the present example. Thus, the user selects grouping designation in the setting mode and selects a genre to be designated from within a genre list prepared in advance.

Further, the recording and reproduction apparatus of the present embodiment produces, as a representation image for representing each broadcasting program content, a thumbnail image such as, for example, a title screen of the broadcasting program and stores the thumbnail image as display data.

Then, the recording and reproduction apparatus of the present embodiment displays, on the display screen, such thumbnail images as representation images of broadcasting contents as described above in the order according to the year, month, day and hour of the storage in each group. In the present embodiment, the order can be selected from between an ascending order and a descending order in time in the setting mode by the user.

On the display screen 90 of the example of FIG. 19, a plurality of representation images representing different broadcasting program contents from within the data of the broadcasting program contents stored on the content data storage section are displayed in a state arrayed in a vertical direction.

In this instance, a thumbnail image of a broadcasting program content selected last in the search of data in the past is displayed as a noticed thumbnail image 91C substantially at the center of the screen in the vertical direction. Further, a plurality of thumbnail images of different broadcasting program contents preceding to and following the broadcasting program content represented by the noticed thumbnail image 91C are arrayed in the order above and below the noticed thumbnail image 91C.

Also in the present example, the noticed thumbnail image 91C is displayed at the fixed position on the display screen 90 emphatically, for example, in a size greater than that of the other thumbnail images. As a method of emphatically displaying the noticed thumbnail image 91C, such a method of displaying the noticed thumbnail image 91C in a color different from that of the other thumbnail images or the like may be used solely or in combination with the size emphasis.

On the left side of the noticed thumbnail image 91C, the genre name as a group to which the broadcasting program content represented by the noticed thumbnail image belongs is displayed in a group name display place 92. Further on the right side of the noticed thumbnail image 91C, a display place or places for explanation information are provided. In particular, in the example shown in FIG. 19, a broadcasting program content storage time display place 93, a broadcasting station name display place 94 for displaying the name of a broadcasting station by which the broadcasting program content was provided and a broadcasting program name display place 95 are displayed in two lines.

In the broadcasting program content storage time display place 93, the year, month, day and hour when the data of the broadcasting program content were stored on the content data storage section is displayed. In the broadcasting station name display place 94, the name of the broadcasting station by which the broadcasting program content was provided, and the name of the broadcasting program is displayed in the broadcasting program name display place 95.

On the screen of FIG. 19, the group name or explanation information is not displayed with regard to the thumbnail images of the other broadcasting program contents similarly as in the preceding embodiments.

If, in a state wherein the screen of FIG. 19 is displayed, the user operates the upward or downward direction indicating operation button of the operation inputting section of the remote controller transmitter or the like, then the thumbnail images are shifted one by one in the vertical direction so that the noticed thumbnail image 91C may be changed.

Figure 20:
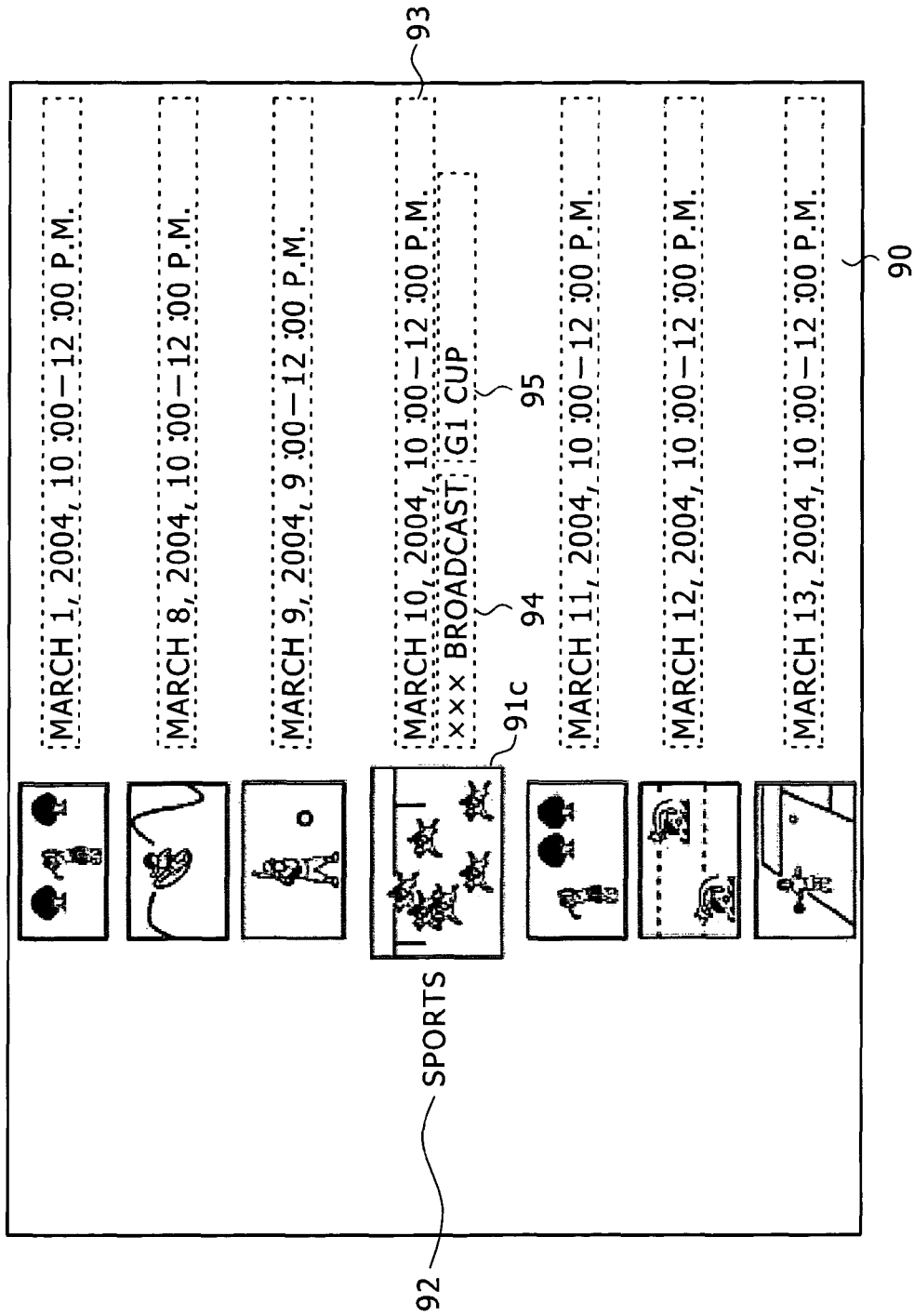
FIGS. 20 and 21 are schematic views showing different examples of the graphical user interface screen of FIG. 19 upon scrolling.

Then, if, in the state wherein the screen of FIG. 19 is displayed, the user uses the operation inputting section of the remote controller transmitter or the like to start scrolling, then explanation information is displayed not only with regard to the noticed thumbnail image but also with regard to thumbnail images preceding to and following the noticed thumbnail image as seen in FIG. 20. At this time, as explanation information with regard to the noticed thumbnail image, the broadcasting program content storage time display place 93 and the broadcasting station name display place 94 and broadcasting program name display place 95 are displayed in two lines. However, as explanation information with regard to the thumbnail images other than the noticed thumbnail image, only some of the broadcasting program content storage time display place 93 and the broadcasting station name display place 94 and broadcasting program name display place 95 is displayed. In the example shown in FIG. 20, only the broadcasting program content storage time display place 93 is displayed as explanation information.

Since explanation information not only of the noticed thumbnail image but also of thumbnail images preceding to and following the noticed thumbnail image in this manner, it is easy for the user to find out a desired broadcasting program content by a scrolling search.

Then, if the scrolling is further continued, then the scrolling speed rises gradually, and while the noticed thumbnail image 91C and the group name (genre name) remain displayed densely, the explanation information displays are displayed less densely in response to the scrolling speed. At this time, only the explanation information of the noticed thumbnail image 91C may otherwise remain displayed densely or be displayed more densely than the other explanation information displays so that attention may be paid to the same.

Figure 21:
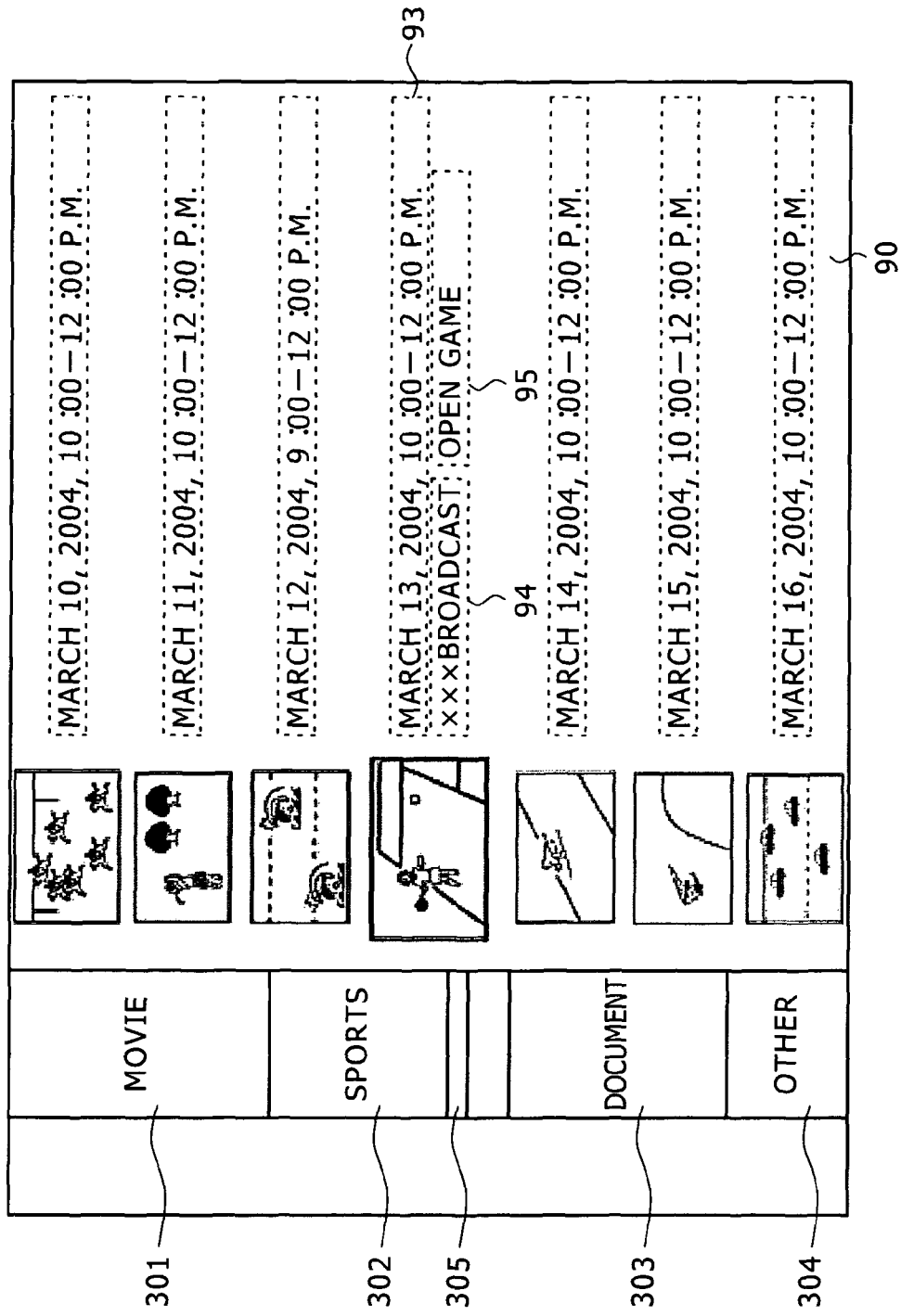

Then, if the scrolling speed exceeds a predetermined scrolling speed determined in advance, then the display screen 90 changes to such a screen as shown in FIG. 21, in which the group name display place on the left side of the noticed thumbnail image 91C disappears and a group bar 300 extending along the array of the thumbnail images is displayed instead. The group bar 300 in this example is divided into groups depending upon the designated genres, and in regions 301, 302, 303 and 304 of the divisional groups in the example shown, the genre names "movie", "sports", "document" and "others" are displayed in accordance with the designations of the user, respectively.

Further, a noticed position display mark 305 is displayed on the group bar 300 and indicates the position in order and the group of the broadcasting program content of the noticed thumbnail image 91C.

Accordingly, the user can recognize a scrolling search position readily by referring to the group bar, and this facilitates a search for a desired broadcasting program content together with the thumbnails and the explanation displays of the thumbnail images.

The scrolling processing action in the third embodiment is similar to the processing action described hereinabove with reference to FIG. 18. Therefore, description of the scrolling processing action is omitted herein to avoid redundancy.

It is to be noted that, while the group bar 300 is displayed so as to appear when a particular scrolling speed is reached, it may otherwise be displayed so as to appear at a point of time at which scrolling is started.

Further, not the group bar but a bar which does not involve group divisions may be displayed such that only the noticed position display mark 305 indicating the position of the noticed thumbnail image is displayed on the bar. In this instance, the name of the group to which the noticed thumbnail image belongs may be displayed at some separate location.

[Other Modifications]

It is to be noted that the selection object items represented by item icons or thumbnail images may be some other contents. For example, the object of item icons or thumbnail images may be contents of electronic books or game programs. The content here is defined as a movie, music, a play, literature, a photograph, a cartoon, an animation, a computer game, or a character, a graphic form, a color, sound, action or an image or a combination of them, or a program for providing information relating to them through a computer, which is created by creative activities of the human being and belongs to the culture or entertainment.

Further, while, in the embodiments described above, the display position of the group bar is set to the left side with respect to the noticed item icon, it is not restricted to this position but may be set to some other position. Further, the group bar need not be displayed along an array of representation images such as an item icon array or a thumbnail image array, but may be displayed in a direction different from the direction of the array of representation images.

Further, the mark representing the noticed item icon position on the group bar is not limited to the example described above, but such a displaying method that, for example, a triangular mark or an arrow mark is displayed on the outer side of the bar may be used.

Further, while the representation images in the example described hereinabove with reference to the drawings are icons including a graphic form or a character, icons formed from a channel number or thumbnail images formed from images obtained by reducing the size of some images of a broadcasting program, some other symbols may be used as the representation images.

While, in the foregoing embodiments, the electronic apparatus of the present invention is a broadcasting reception apparatus, the electronic apparatus according to the present invention is not limited to such a broadcasting reception apparatus as described above but can be applied to any electronic apparatus, for example, such as the recording and reproduction apparatus for image data and sound data only if the electronic apparatus includes a plurality of categories each of which has a plurality of processing function items in a lower hierarchy thereof.

While preferred embodiments of the present invention have been described using specific terms, such description is for illustrative purposes only, and it is to be understood that changes and variations may be made without departing from the spirit or scope of the following claims.

What is claimed is:

1. An electronic apparatus, comprising:
   a storage section for storing display data of a plurality of representation images individually representing a plurality of selection object items;
   an operation inputting section for accepting an operation input of a user for images displayed on a display screen and including the plurality of representation images and outputting the corresponding operation output signal; and a display control section for displaying said plurality of representation images using the display data stored in said storage section such that the plurality of representation images are arrayed along one direction of said display screen and one of the representation images can be selected in response to an operation input through said operation inputting section;

in a normal mode, said display control section emphatically displaying a noticed representation image selected from among the plurality of representation images with the display position of the selected noticed representation image fixed on said display screen, said display control section changing the noticed representation image in response to the operation output signal based on a selection operation of one of the representation images through said operation inputting section, said display control section displaying explanation information of the noticed representation image in the proximity of the display position of the noticed representation image;

said operation inputting section being operable to accept an operation input of the user for scrolling the plurality of representation images in the one direction and output a scrolling operation output signal affecting change from the normal mode to a continuous-scrolling mode;

in the continuous-scrolling mode, said display control section executing the scrolling in response to the scrolling operation output signal such that in addition to explanation information of the noticed representation image, additional explanation information of one or more additional representation images of the plurality of representation images which are different from the noticed representation image and are arrayed along the one direction on the display screen is displayed and the noticed representation image is successively changed during the scrolling, wherein, in the continuous-scrolling mode, the explanation information of the noticed representation image is displayed emphatically together with the noticed representation image, and wherein, in the normal mode, the additional explanation information is not displayed, and in the continuous-scrolling mode the additional explanation information includes information related to content and further includes a smaller number of explanation items for each of the one or more additional representation images than that of the explanation information of the noticed representation image.

2. The electronic apparatus according to claim 1, wherein said display control section additionally displays, on said display screen, a bar display including a mark representing the position of the noticed representation image in the array of the plurality of representation images including the noticed representation image in response to the scrolling operation output signal.

3. The electronic apparatus according to claim 2, wherein the plurality of representation images are divided into a plurality of groups based on attributes relating to the selection object items and the displaying order of the plurality of representation images on said display screen is set collectively for each of the groups while the bar display is divided into a plurality of divisional portions in response to the plurality of groups and each of the divisional portions of the bar display is provided with a group display representing to which one of the groups the divisional portion belongs.

4. The electronic apparatus according to claim 2, wherein the speed of the scrolling is controlled so as to increase in accordance with the period of time after the scrolling is started in response to the scrolling operation output signal, and the bar display appears on said display screen after the speed of the scrolling exceeds a speed determined in advance.

5. The electronic apparatus according to claim 3, wherein the representation images are icons which represent contents and the grouping is performed based on attributes of the contents.

6. The electronic apparatus according to claim 1, wherein, when the plurality of representation images which represent the selection object items are to be displayed on said display screen, said display control section displays the plurality of representation images in a translucent and overlapping relationship on the screen of an image of an image content displayed on said display screen.

7. An electronic apparatus, comprising:
a storage section for storing display data of a plurality of representation images individually representing a plurality of selection object items;

an operation inputting section for accepting an operation input of a user for images displayed on a display screen and including the plurality of representation images and outputting the corresponding operation output signal; and a display control section for displaying the plurality of representation images using the display data stored in said storage section such that the plurality of representation images are arrayed along one direction of said display screen and one of the plurality of representation images can be selected in response to an operation input through said operation inputting section;

in a normal mode, said display control section emphatically displaying a noticed representation image selected from among the plurality of representation images with the display position of the selected noticed representation image fixed on said display screen, said display control section changing the noticed representation image in response to the operation output signal based on a selection operation of one of the plurality of representation images through said operation inputting section, said display control section displaying explanation information of the noticed representation image in the proximity of the display position of the noticed representation image, the plurality of representation images being partitioned into a plurality of groups based on attributes relating to the selection object items, wherein each one group of the plurality of groups is related to more than one of the plurality of representation images;

said operation inputting section being operable to accept an operation input of the user for scrolling the plurality of representation images in the one direction and output a scrolling operation output signal affecting change from the normal mode to a speedy-scrolling mode;

in the speedy-scrolling mode, said display control section executing the scrolling in response to the scrolling operation output signal such that the noticed representation image is successively changed during the scrolling;

in the speedy-scrolling mode, said display control section displaying, on said display screen, in addition to the plurality of representation images, a bar display which is distinct from and corresponds to the array of the plurality of representation images, is not displayed in the normal mode, and includes a mark representing the position of the noticed representation image in the array of the plurality of representation images including the noticed representation image, the bar display being divided into a plurality of divisional portions corresponding to the plurality of groups, each of the divisional portions of the bar display being provided with a group display representing to which one of the groups the divisional portion belongs, wherein, in the speedy-scrolling mode, the explanation information of the noticed representation image is displayed emphatically together with the noticed representation image, and the explanation information of the plurality of representation images other than the noticed representation image is given with a smaller number of explanation items than that of the explanation information of the noticed representation image.

8. A display controlling method for an electronic apparatus comprising at least one memory for storing instructions, a storage apparatus having a storage section, a remote controller transmitter, a display control section, at least one processor configured to access the at least one memory and the display control section and to execute a plurality of software modules, said storage section for storing display data of a plurality of representation images individually representing a plurality of selection object items, an operation inputting section provided by the remote controller transmitter for accepting an operation input of a user for images displayed on a display screen and including the representation images, and said display control section for displaying, in a normal mode, the plurality of representation images using the display data stored in said storage section such that the plurality of representation images are arrayed along one direction of said display screen and one of the plurality of representation images can be selected in response to an operation input through said operation inputting section, said display control section emphatically displaying a noticed representation image selected from among the plurality of representation images with the display position of the selected noticed representation image fixed on said display screen, said display control section changing the noticed representation image in response to the operation output signal based on a selection operation of one of the plurality of representation images through said operation inputting section, said display control section displaying explanation information of the noticed representation image in the proximity of the display position of the noticed representation image, said display controlling method comprising:

a step executed by said operation inputting section of accepting an operation input of the user for scrolling the plurality of representation images in the one direction and outputting a scrolling operation output signal affecting change from the normal mode to a continuous-scrolling mode; and in the continuous-scrolling mode, a step executed by said display control section of executing the scrolling in response to the scrolling operation output signal such that in addition to explanation information of the noticed representation image, additional explanation information of one or more additional representation images of the plurality of representation images, which are different from the noticed representation image, in a preceding direction and/or a succeeding direction with respect to the noticed representation image is displayed on said display screen, wherein, in the continuous-scrolling mode, the explanation information of the noticed representation image is displayed emphatically together with the noticed representation image, and wherein, in the normal mode, the additional explanation information is not displayed, and in the continuous-scrolling mode the additional explanation information includes information related to content and further includes a smaller number of explanation items for each of the one or more additional representation images than that of the explanation information of the noticed representation image.

9. The display controlling method for an electronic apparatus according to claim 8, wherein, when the scrolling speed becomes a speed determined in advance, said display control section additionally displays, on said display screen, a bar display including a mark representing the position of the noticed representation image in the array of the plurality of representation images including the noticed representation image.

10. The display controlling method for an electronic apparatus according to claim 9, wherein the plurality of representation images are divided into a plurality of groups based on attributes relating to the selection object items and the plurality of representation images are arranged collectively for each of the groups while the location of the bar display corresponding to the scrolling direction is divided into a plurality of divisional portions in response to the plurality of groups and each of the divisional portions of the bar display is provided with a group display representing to which one of the groups the divisional portion belongs.

11. A display controlling method for an electronic apparatus comprising at least one memory for storing instructions, a storage apparatus having a storage section, a remote controller transmitter, a display control section, at least one processor configured to access the at least one memory and the display control section and to execute a plurality of software modules, said storage section for storing display data of a plurality of representation images individually representing a plurality of selection object items, an operation inputting section provided by the remote controller transmitter for accepting an operation input of a user for images displayed on a display screen and including the plurality of representation images and outputting the corresponding operation output signal, and said display control section for displaying, in a normal mode, the plurality of representation images using the display data stored in said storage section such that the plurality of representation images are arrayed along one direction of said display screen and one of the plurality of representation images can be selected in response to an operation input through said operation inputting section, said display control section emphatically displaying a noticed representation image selected from among the plurality of representation images with the display position of the selected noticed representation image fixed on said display screen, said display control section changing the noticed representation image in response to the operation output signal based on a selection operation of one of the plurality of representation images through said operation inputting section, said display controlling method comprising:

the plurality of representation images being partitioned into a plurality of groups based on attributes relating to the selection object items, wherein each one group of the plurality of groups is related to more than one of the plurality of representation images;

a step executed by said operation inputting section of accepting an operation input of the user for scrolling the plurality of representation images in the one direction and outputting a scrolling operation output signal affecting change from the normal mode to a speedy-scrolling mode; and in the speedy-scrolling mode, a step executed by said display control section of executing the scrolling in response to the scrolling operation output signal such that the noticed representation image is successively changed during the scrolling and displaying, on said display screen, in addition to the plurality of representation images, a bar display which is distinct from and corresponds to the array of the plurality of representation images, is not displayed in the normal mode, and includes a mark representing the position of the noticed representation image in the array of the plurality of representation images including the noticed representation image, the bar display being divided into a plurality of divisional portions corresponding to the plurality of groups, each of the divisional portions of the bar display being provided with a group display representing to which one of the groups the divisional portion belongs, wherein, in the speedy-scrolling mode, the explanation information of the noticed representation image is displayed emphatically together with the noticed representation image, and the explanation information of the plurality of representation images other than the noticed representation image is given with a smaller number of explanation items than that of the explanation information of the noticed representation image.

12. A graphical user interface having a plurality of functional components and provided in an electrical apparatus, the graphical user interface comprising:

a plurality of representation images representing selection object items and arrayed along one direction on a display screen, the plurality of representation images being changed in response to a selection operation of the plurality of representation images through an operation inputting section provided by the remote controller transmitter;

in a normal mode, a noticed representation image which is representing the desired item and selected from among the plurality of representation images, being displayed emphatically at a fixed position on said display screen;

explanation information of the selection object items being displayed in the proximity of the display position of the plurality of representation images;

wherein, in a continuous-scrolling mode, the plurality of representation images being scrolled in response to a scrolling instruction therefor inputted through said operation inputting section such that in addition to explanation information of the noticed representation image, explanation information of one or more additional representation images of the plurality of representation images which are different from the noticed representation image and are arranged along the one direction is displayed, wherein, in the continuous-scrolling mode, explanation information of the noticed representation image is displayed emphatically together with the noticed representation image, and wherein, in the normal mode, the additional explanation information is not displayed, and in the continuous-scrolling mode the additional explanation information includes information related to content and further includes a smaller number of explanation items for each of the one or more additional representation images than that of the explanation information of the noticed representation image.

13. The graphical user interface according to claim 12, wherein, when the scrolling speed becomes a speed determined in advance, a bar display including a mark representing the position of the noticed representation image in the array of the plurality of representation images which belong to the selected representation image is displayed additionally on said display screen.

14. The graphical user interface according to claim 13, wherein the plurality of representation images which belong to the selected representation image are divided into a plurality of groups based on attributes relating to the selection object items and the plurality of representation images are arranged collectively for each of the groups while the bar display is divided into a plurality of divisional portions in response to the plurality of groups and each of the divisional portions of the bar display is provided with a group display representing to which one of the groups the divisional portion belongs.

15. A graphical user interface having a plurality of functional components and provided in an electrical apparatus, the graphical user interface comprising:

a plurality of representation images representing selection object items and arrayed along one direction on a display screen, the plurality of representation images being changed in response to a selection operation of the plurality of representation images through an operation inputting section;

in a normal mode, a noticed representation image which is selected from among the plurality of representation images being displayed emphatically at a fixed position on said display screen;

explanation information of the noticed representation image being displayed in the proximity of the display position of the plurality of representation images;

wherein the plurality of representation images is partitioned into a plurality of groups based on attributes relating to the selection object items, wherein each one group of the plurality of groups is related to more than one of the plurality of representation images;

wherein switching from the normal mode to a speedy-scrolling mode is affected and scrolling of the plurality of representation images is performed in response to a scrolling instruction inputted through said operation inputting section, and in the speedy-scrolling mode a bar display which is distinct from and corresponds to the array of the plurality of representation images and is not displayed in the normal mode, is displayed on said display screen in addition to the plurality of representation images, the bar display including a mark representing the position of the noticed representation image in the array of the plurality of representation images, the bar display being divided into a plurality of divisional portions corresponding to the plurality of groups, each of the divisional portions of the bar display being provided with a group display representing to which one of the groups the divisional portion belongs, wherein, in the speedy-scrolling mode, explanation information of the noticed representation image is displayed emphatically together with the noticed representation image, and the explanation information of the plurality of representation images other than the noticed representation image is given with a smaller number of explanation items than that of the explanation information of the noticed representation image.

* * * * *